US011645601B2

(12) United States Patent
Gampel

(10) Patent No.: US 11,645,601 B2
(45) Date of Patent: May 9, 2023

(54) SYSTEMS AND METHODS FOR A PSYCHOLOGICAL-BASED APPROACH FOR ORGANIZATIONAL GROWTH OF A BUSINESS

(71) Applicant: Moshe Nathaniel Gampel, East Brunswick, NJ (US)

(72) Inventor: Moshe Nathaniel Gampel, East Brunswick, NJ (US)

( * ) Notice: Subject to any disclaimer, the term of this patent is extended or adjusted under 35 U.S.C. 154(b) by 0 days.

(21) Appl. No.: 17/864,456

(22) Filed: Jul. 14, 2022

(65) Prior Publication Data
US 2023/0033483 A1 Feb. 2, 2023

Related U.S. Application Data

(60) Provisional application No. 63/221,544, filed on Jul. 14, 2021.

(51) Int. Cl.
*G06Q 10/06* (2023.01)
*G06Q 10/0637* (2023.01)
*G06Q 10/0631* (2023.01)

(52) U.S. Cl.
CPC ... *G06Q 10/0637* (2013.01); *G06Q 10/06316* (2013.01)

(58) Field of Classification Search
CPC ..................................................... G06Q 10/06
See application file for complete search history.

(56) References Cited

U.S. PATENT DOCUMENTS

| 8,781,882 B1* | 7/2014 | Arboletti ............ G06Q 10/0639 705/7.41 |
| 2014/0074557 A1* | 3/2014 | Rallapalli ........ G06Q 10/06316 705/7.36 |
| 2021/0311938 A1* | 10/2021 | Chennen ............... G06F 16/217 |

FOREIGN PATENT DOCUMENTS

WO  WO-2021077059 A1 *  4/2021  ..... G06Q 10/063112

OTHER PUBLICATIONS

Vikas S. Jadhav and V. Vivekanand, Identification of Bottleneck and Reducing Cycle Time of an Industrial Oven by Using Project Management Techniques, International Research Journal of Engineering and Technology (IRJET), vol. 04 Issue: 06, pp. 1678-1683, Jun. 2017. (Year: 2017).*

* cited by examiner

*Primary Examiner* — Kurtis Gills
(74) *Attorney, Agent, or Firm* — Gearhart Law LLC; David Postolski

(57) ABSTRACT

A system and method for a psychological-based approach for organizational growth of a business is described herein. The method is executed by an engine, an application, a software program, a service, or a software platform on a computing device. The engine includes an artificial intelligence (AI) component. The method includes: capturing data associated with a project continuously and in real-time, combining the captured data with other data to create a data set, utilizing the data set to better predict and drive a resolution of one or more problems associated with the project, outputting a plurality of frameworks to address the one or more problems, receiving a selection from a user of a framework from the plurality of frameworks to address the one or more problems, executing a base build using the selected framework to address the one or more problems.

12 Claims, 24 Drawing Sheets

Key Stakeholders
Please provide a list of key stakeholders including. Name, Number of reports, Areas of influence, Function overview, Level of impact, and Explanation of impact.

Name

Title

Email

Phone

Area of Influence

Number of Reports

Enter functions...

18

Responsibilities Overview

Level of Impact

Type here......

Select

Explanation of Impact

Type here......

Comms, Group

Type here......

Notes

Type here......

+ Add a stakeholder

Previous  Next

○ Welcome

◎ Assessment

○ High Level Output

- Assess
- Base Build
- Execute
- Scale
- Reporting
- Training
- Operating Model Change management
- Settings
- Logout

Assessment

Please provide or select the names of individuals who can provide additional perspective for this project:

① ② ③ ④ ⑤ ⑥ ⑦ ⑧ ⑨

Please make your selections:

[Search individual by name ▽]

☑ + Add New
☑ Charlie Uschen, CEO
☐ Dara Litman, CMO
☐ James Tucker, CTO

Once complete, click "Send" to invite your selections into project Transformation

[Send Invite]

○ Welcome
◉ Assessment
○ High Level Output

[Previous] [Next]

- 🔍 Assess ← 112
- ▱ Base Build
- ⬡ Execute
- ✤ Scale
- ▭ Reporting
- 🎓 Training
- Operating Model
- Change management
- ⚙ Settings
- ⏻ Logout

FIG. 10

Assessment

The following questions are designed to allow us to easily identify initiatives, urgencies and ultimate outcome looking to be achieved.

① ② ③ ④ ⑤ ⑥ ⑦ ⑧

On a scale of 1 to 5, 5 being the highest, rate how important you think this initiative is relative to other efforts (planned or under discussion) of similar magnitude Least Important           Very important
1    2    3    4    5
◉    ○    ○    ○    ○

Previous    [ Next ]

- Assess — 112
- Base Build
- Execute
- Scale
- Reporting
- Training
- Operating Model
- Change management
- Settings
- Logout ○ Welcome
◉ Assessment
○ High Level Output

FIG. 12

| WORK STREAM NAME 236 | KTA$_a$ 238 | KTA$_e$ 240 | KTA$_p$ 242 |
|---|---|---|---|
| Communications | 0.5 | 0.5 | 0.7 |
| Compliance | 0.2 | 0.2 | 0.2 |
| Corporate Education | 0.7 | 0.7 | 0.5 |
| Finance | 0.5 | 0.5 | 0.5 |
| HR | 0.7 | 0.7 | 0.6 |
| IT | 0.7 | 0.7 | 0.2 |
| Media Monitoring | 0.7 | 0.7 | 0.7 |
| Operations | 0.5 | 0.5 | 0.5 |
| Payments Post | 0.2 | 0.2 | 0.2 |
| | 0.2 | 0.2 | 0.2 |
| | 0.2 | 0.2 | 0.2 |
| | 0.2 | 0.2 | 0.2 |
| TOTAL 244 | 0.44 | 0.44 | 0.38 |

FIG. 17

| Measure | Definition |
| --- | --- |
| About the program | Highest level program description and key messages |
| What are we trying to accomplish | From - to visual model |
| Goals and objectives assessment | Using a scale of high, medium or low, identify the most important goals and rate them on a scale of clarity, messaging, achievability and acceptance. Includes a review of resources and resource availability for achievability |
| Program Type | Classify the program into the 4 categories of transformational change and explain why this is important |
| Management Sponsored | Level of support from management for this program, particularly from the senior most leader |
| Special Project | How different is this program's delivery from BAU delivery |
| Heavy Investment | Using a high, medium low scale, define the investment required in terms of 1) client 2) people 3) process 4) technology and 5) culture |
| Quantifiable | Are the goals for this transformation measurable but also achievable |
| Changing Norms | To what extent will this program alter the way organization 1) thinks 2) makes decisions and 3) delivers for clients in business as usual |
| Program Leadership | Identify the key leadership roles and responsibilities and assess whether the client has these roles at the ready |
| Culture assessment | High level view of how culture will change and why? |

All rows above grouped under: Executive Summary (A)

FIG. 18

| Supporting questions | Section | Deliverable |
|---|---|---|
| 1.1 1.2 1.3 1.4 1.5 1.7 1.8 5.1 | Change Profile | Custom slide |
| 1.1 1.2 1.3 1.4 1.5 1.7 1.8 | Change Profile | Custom slide |
| 1.4 1.5 1.7 1.8 1.9 | Change Profile | Slide as a table |
| 1.1 1.21.31.41.51.7 | Change Profile | Slide as a table |
| 3.23.33.43.53.63. 73.83.94.14.24.34.44. 54.64.75.1 | Change Profile | Simpel Transformation Test output slide |
| 1.1 1.2 1.3 1.4 1.5 1.7 1.85.1 | Change Profile | Simpel Transformation Test output slide |
| 1.1 1.2 1.3 1.4 1.5 1.7 1.85.12.142.153.53.63 .73 .84.24.34.44.54.6 | Change Profile | Simpel Transformation Test output slide |
| 1.1 1.2 1.3 1.4 1.5 1.7 1.85.1 | Change Profile | Simpel Transformation Test output slide |
| 1.1 1.2 1.3 1.4 1.5 1.7 1.85.12.52.62.12. 142.15 | Change Profile | Simpel Transformation Test output slide |
| 2.8 2.92.13. 13.63.74.14.24.3 | Organization | 2 slide 1) methodology and 2) key roles and assessment of availability |
| 2.1 2.2 2.3 2.4 2.5 2.65.5 | Organization | 3 slides 1) culture overview with implications 2) transformation culture with implications 3) post program culture/what is BAU? |

FIG. 18 (Continued)

|  | Change Profile | Organization | Leadership |
|---|---|---|---|
| Definition | • Change context<br>• Transformation type | • Culture<br>• Capabilities | • Alignment<br>• Support |
| Data Point 1 | Burning Platform | Culture | Clarity |
|  | Leadership expressed a desire to do this program because they are losing market share to a competing product and must respond now to prevent further losses | Many expressed a desire to balance how decisions are made between IT and the Business | Perceived misalignment around scope across multiple resources |
| Data Point 2 | Goals & Objectives | Capabilities | Stakeholders |
|  | Increase revenues from Product 123 by 10% per year | There may be a need to hire/train a large number of resources do to recent organization changes | Clarity needed around how key roles work together across the strategy to Execution value -chain |
| Data Point 3 | Program Description | Product Profile | Capability |
|  | Project will stand up a strategic innovation team that will deliver 3 product updates a year and measure success failure and own corrective actions. | Changing product strategy suggests a need for greater focus on innovation | We have many systems and resources but they are likely not fit to purpose including working at scale |
| Implication | - Identify a product owner<br>- Conduct market research<br>- Identify ops and tech. folks for detailed planning | • Incorporate product strategy into our approach<br>• Gather more data about the workforce<br>• Discuss the role of innovation with Leadership | • Communicate project scope<br>• Clarify care roles and responsibilities<br>• Develop solution requirements document |

FIG. 19

| CLIENT OVERVIEW 228 | GOALS/OBJECTIVES 230 | MEASUREMENT 232 | SAMPLE PROJECTS 234 |
|---|---|---|---|
| About the client's business<br>About the client's business | Goal 1<br>Goal 1 | Goal 1<br>Goal 1 | Goal 1<br>Goal 1 |
| About the client's customers<br>About the client's customers | Goal 2<br>Goal 2 | Goal 2<br>Goal 2 | Goal 2<br>Goal 2 |
| About the client's competition<br>About the client's competition | Goal 3<br>Goal 3 | Goal 3<br>Goal 3 | Goal 3<br>Goal 3 |
| About the client's people<br>About the client's people | Goal 4<br>Goal 4 | Goal 4<br>Goal 4 | Goal 4<br>Goal 4 |
| What does the client deliver/do<br>What does the client deliver/do | Goal 5<br>Goal 5 | Goal 5<br>Goal 5 | Goal 5<br>Goal 5 |

FIG. 20

| Stage | Deliverables | Status | November | December | January | February | March |
|---|---|---|---|---|---|---|---|
| Assess | Kinetic Transformation Assessment | C | | | | | |
| | Detailed Workplan and Approach | C | ⭐A | | | | |
| Base Build | Stand up the Project Management Office | G | | | | | |
| | Design Workfront Pilots | G | | | | | |
| | Deliver Pilots | G | | | ⭐B | | |
| Execution Support | Generate Data, Promote Accountability and Alignment | N/S | | | | Business as Usual | |
| | Improve the program | N/S | | | | | |
| Build Scale | Scale the solution | N/S | | | | ⭐D | |

(Thanksgiving; Program Pause)

112 — Assess
116 — Base Build
216 — Execution Support
218 — Build Scale

Timeline dependent upon availability of client staff and data

⭐ = Milestone   ▢ = Duration

Milestone
A = Revised SoW workplan    C = IC Decision Meetings
B = Go Live                  D = Future State working session

FIG. 22

SYSTEMS AND METHODS FOR A PSYCHOLOGICAL-BASED APPROACH FOR ORGANIZATIONAL GROWTH OF A BUSINESS

CROSS-REFERENCE TO RELATED APPLICATIONS SECTION

This application is a U.S. Non-Provisional patent application that claims priority to U.S. Provisional Patent Application Ser. No. 63/221,544 filed on Jul. 14, 2021, the entire contents of which are hereby incorporated by reference in their entirety.

FIELD OF THE EMBODIMENTS

The field of the invention and its embodiments relate to a system and method for a psychological-based approach for organizational growth of a business.

BACKGROUND OF THE EMBODIMENTS

Successful business change can be a complex, multi-faceted undertaking that is very difficult to achieve. With a recognized failure rate of greater than 70% and the survival of virtually any organization often tied to its ability to adapt to a barrage of constantly shifting internal and external pressures, the stakes for change cannot be higher. When these pressures manifest into a focused effort by a business to respond, the resulting group of tasks performed by members of an organization, its suppliers and/or systems is known as a "Transformation Initiative" or "big change program".

Transformation Initiatives come in all shapes and sizes with a virtually infinite number of possible outcomes. Sometimes the program is the result of 2 companies merging. Other times, the program may represent changes to an organization as it adapts to installation of a large piece of new software. Whatever the impetus for the program and its intended outcome, each program is unique and often requires a tailored approach overseen by a specialist to mobilize a successful response. For our purposes, the specialist responsible for leading Transformation Initiatives is known as a Transformation Lead.

As organizations grow, the impact and size of these programs often grows with it. Frequently this results in the need for a diverse set of subject matter expertise that can vary over the course of the life of the program. Over the last 50+ years, this has resulted in a large and dynamic global industry to serve these unique needs for companies at scale (such as organizations with more than $100 million in revenue). This industry is commonly referred to as the "Transformation" or "Digital Transformation Consulting" industry and it is estimated to grow into the hundreds of billions of dollars globally in the coming years as organizations continue to modernize and adjust to changing work habits.

To help alleviate costs and retain more of the knowledge "in house," organizations, especially those that are larger (e.g., more than $100+ million in annual revenue), may support their own network of internal personnel, such as program or project managers who are designated for serving complex programs across the entirety of an organization's needs. These internal team members may be centrally located within a single team or spread across an organization. Either way, these personnel are skilled, rare and by extension, valuable.

The criticality of these resources becomes even more pronounced during "Transformation Initiatives," when business as usual is disrupted and time is often of the essence. It takes a skilled hand to face the tidal wave of change brought on by a large change program, like a merger or integration, and the speed with which an organization can mobilize and sustain these personnel are often an early indication of whether the program will be successful.

Whether the program is supported by internal or external resources, maintaining this cohort of employees becomes increasingly difficult as large change programs can be very complicated, stressful and can run for longer durations than standard consulting engagements (e.g., across years as compared to months). Indeed, these programs often demand diverse skillsets that are ever changing as the program unfolds. Knowledge retention and the need to work within timelines and frameworks that may be alien to an organization's standard operating procedure become exponential problems that grow as time moves on and the program or change progresses.

Though the global management consulting industry has grown to hundreds of billions of dollars worldwide and transformation related business to the trillions of dollars globally, interestingly, failure rates remain stubbornly persistent. Indeed, academics and leaders in the field typically report that Transformation Initiatives fail an astounding 70% of the time—deemed "The 70% Challenge." While there is no shortage of opinion for why these programs fail so frequently, personal research reveals the following key contributors: (a) losing the hearts and minds of the people, (b) communication challenges between teams, (c) unpredictability and insecurity due to lack of understanding what is next, (d) fatigue and cost both in terms of human capital as well as other "hard assets," and (e) the process by which large duration change programs are approached.

Given the challenges associated with properly executing change at scale and the persistent risk of failure, a new approach is long overdue. This instant invention provides an enhanced system or method that addresses why these programs fail and how to address the shortcomings. Specifically, this new approach accounts for the reality that change and risk are a "never-ending" natural phenomenon that cannot be controlled, but can be managed. Management allows for an understanding of what large change is and where in a change cycle a team is. Replacing the chaos and fatigue of change programs with more predictable cycles that drive the work team will lead to favorable outcomes.

Large change, such as changes that alter who a person or organization is and how it behaves or operates is different than every day change that we experience during the course of life. These types of changes are transformational and therefore demand an investment that corresponds to the risk. This means not only developing people, but also systems and processes that normalize behavior during impactful events so activities can be organized and action deployed to further a mission.

Thus, the instant invention proffers that if change and entropy are natural, never-ending phenomenon, a successful large change program demands a flexible approach that centers on alignment over rigid tools or methods. In fact, a single unifying approach or philosophy to large change that centers on alignment over dogma is more likely to succeed.

Further, the instant invention takes into account the fact that traditional change management approaches are doomed to fail because they do not fully account for the dynamic nature of large programs as compared to traditional change project exercises. The evolution in how work gets done across an organization coupled with market complexities have rendered traditional change management theories, such as the commonly known "unfreeze, change, refreeze" model, insufficient for today's large-scale change programs. The instant invention provides a new approach that addresses the shortcomings found in traditional systems.

SUMMARY OF THE EMBODIMENTS

The present invention and its embodiments relate to a system and method for a psychological-based approach for organizational growth of a business.

A first embodiment of the present invention describes a method executed by an engine on a computing device for providing a psychological-based approach for organizational growth of a business. In examples, the engine includes an artificial intelligence (AI) component. It should be appreciated that in other examples, the engine may be an application, a software program, a service, or a software platform executable on the computing device.

The method includes numerous process steps, such as: providing, via a graphical user interface (GUI) of the computing device, a dashboard to a user and providing, via the GUI and to the user, a questionnaire associated with a project of a business. The questions may be associated with employees of the business, a culture of the business, goals associated with the project, or budgets associated with the project. Further, the project is a change project for the business.

Moreover, the method includes: receiving, via the GUI and from the user, a response to each question of the questionnaire; capturing, in real-time, data from the response to each question of the questionnaire; and analyzing the data to predict and drive a resolution of one or more problems associated with the project (e.g., a location factor associated with where the one or more problems are predicted to arise and/or a timing factor associated with when the one or more problems are predicted to occur). The data may be stored in a database. The resolution comprises a workplan for the business. The workplan provides measurable outcomes and actions for the business to engage in to address the one or more problems associated with the project. Further, the workplan is user-customizable.

The method also includes: presenting the workplan via the GUI to the user; creating one or more governance structures in the business to execute the workplan; executing one or more process steps to test the workplan; and executing one or more process steps to scale or automate the workplan. Such automation may occur via an API or a third-party product/tool.

In some examples, the method may further include: prompting the user, via the GUI, to input a list of stakeholders for the project; receiving, from the user and via the GUI, the list of stakeholders for the project; and transmitting a message to each stakeholder of the list of stakeholders via a communication means.

In other examples, the method may include providing at least one of advisory services and expert consulting services to the user or to the business to assist in an execution of the workplan.

A second embodiment of the present invention describes a computer system. The computer system includes one or more processors, one or more memories, and one or more computer-readable hardware storage devices. The one or more computer-readable hardware storage devices contain program code executable by the one or more processors via the one or more memories to implement a method for providing a psychological-based approach for organizational growth of a business. The computer system utilizes an algorithm to execute one or more process steps. The method includes numerous process steps, such as: capturing, in real-time, data associated with a project of a business, where the project is a change project for the business. It should be appreciated that though "change projects" are described herein, the system of this invention can work for any program.

The method also includes: organizing the data using standard terms, indexing the data with a unique identifier, combining the data with additional data to create a new data set, and analyzing the new data set to predict and drive a resolution of one or more problems associated with the project (e.g., a location factor associated with where the one or more problems are predicted to arise and/or a timing factor associated with when the one or more problems are predicted to occur). The data and the new data set is stored in a database. The resolution comprises a user-customized workplan for the business. The customized workplan provides measurable outcomes and actions for the business to engage in to address the one or more problems associated with the project.

Further, the method includes: presenting the customized workplan via the GUI to the user, creating one or more governance structures to execute the customized workplan, executing one or more process steps to test the customized workplan, and executing one or more process steps to scale or automate the customized workplan. The automation occurs via an application programming interface (API) or a third-party product/tool. In some instances, the method may further include: providing at least one of advisory services and expert consulting services to the user or to the business to assist in an execution of the workplan.

In general, the present invention succeeds in conferring the following benefits and objectives.

It is an object of the present invention to provide a system and method for a psychological-based approach for organizational growth of a business that may be used any time a new project (e.g., change project) is needed for a business.

It is an object of the present invention to provide a system using artificial intelligence (AI) to capture data concerning people and culture, along with project data like goals, budgets, etc. to create a data set that better predicts where problems in a project will occur and when.

It is an object of the present invention to provide a system that provides an ongoing stream of useable data that can help businesses execute/build a change plan quickly data that actually talks about people from the program.

It is an object of the present invention to provide expert consulting to the c-suite, change managers, project managers, etc. to support a business.

BRIEF DESCRIPTION OF THE DRAWINGS

FIG. 9 depicts a schematic diagram associated with a key shareholders screen of a KTA, in accordance with embodiments of the present invention.

FIG. 10 depicts a schematic diagram associated with an assessment screen of a KTA, in accordance with embodiments of the present invention.

FIG. 12 depicts a schematic diagram showing a ratings screen for an assessment of a KTA, in accordance with embodiments of the present invention.

FIG. 17 depicts a schematic diagram associated with a sample deliverable for Kinetic Transformation Measures (KTMs), in accordance with embodiments of the present invention.

FIG. 18 depicts a block diagram of a sample output from the algorithm, in accordance with embodiments of the present invention.

FIG. 19 depicts a block diagram of a sample analytic framework of a KTA output, in accordance with embodiments of the present invention.

FIG. 20 depicts a schematic diagram associated with a sample artifact for a goals and objectives assessment, in accordance with embodiments of the present invention.

FIG. 22 depicts a schematic diagram associated with a sample work plan, in accordance with embodiments of the present invention.

DESCRIPTION OF THE PREFERRED EMBODIMENTS

Figure 1:
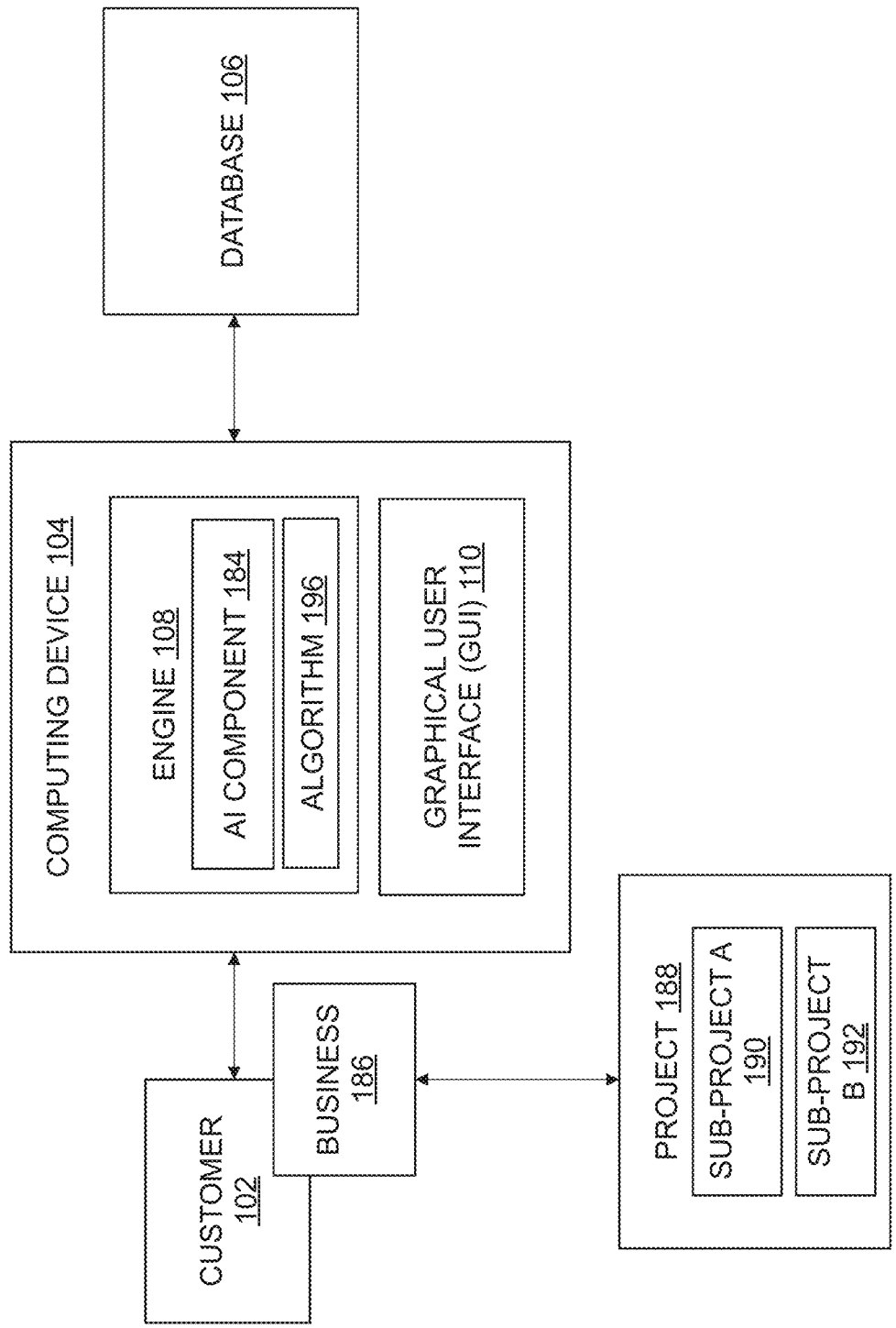
FIG. 1 depicts a block diagram of a system, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Definitions

When the term "about" is used in conjunction with a numerical range, it modifies that range by extending the boundaries above and below those numerical values. In general, the term "about" is used herein to modify a numerical value above and below the stated value by a variance of 20%, 10%, 5%, or 1%. In certain embodiments, the term "about" is used to modify a numerical value above and below the stated value by a variance of 10%. In certain embodiments, the term "about" is used to modify a numerical value above and below the stated value by a variance of 5%. In certain embodiments, the term "about" is used to modify a numerical value above and below the stated value by a variance of 1%.

As described herein, "automated" or "automation" refers to, from a software engineering point of view, a way in which to operate or control software processes without or with minimal human intervention.

As described herein, "Base Build" refers to a minimum viable structure needed to run a sustainable Kinetic Transformation program.

As described herein, "Client Sponsor" refers to a day-to-day strategic program lead.

As described herein, "computing device" may be a computer, a laptop computer, a smartphone, or a tablet, among other examples not explicitly listed herein, and includes, at least, one or more processors, one or more memories, and one or more computer-readable hardware storage devices. The one or more computer-readable hardware storage devices contain program code executable by the one or more processors via the one or more memories to implement a method. Additional structure of the computing device is described and depicted in FIG. 23.

As described herein, "Extract, Transform, Load" or "ETL" refers to a three-phase process where data is first extracted then transformed and finally loaded into an output data container. The data can be collated from one or more sources and it can also be outputted to one or more destinations.

As described herein, "Guided Workflow" refers to a process that helps a user complete the stages of a Kinetic Work Cycle. While this workflow may be customized per client or program need, the workflow will always remain guided by the four stages of the Kinetic Work Cycle, which include: (1) an assessment step, (2) a base building step, (3) an execute step, and (4) a scale step.

As described herein, "Kinetic Project File" or "KPF" refers to a database consisting of a plurality of datasets. In examples, the KPF includes a first dataset and a second dataset. However, it should be appreciated that the KPF is not limited to two datasets. For illustrative purposes, the first dataset includes KTA psychological and organizational based discovery and metrics, as well as data aggregated from a number of sources, e.g. Jira, Workfront, ERP, etc. It should be appreciated that the data may not be "psychological," but include other items, like finance data. The second dataset includes project/program/portfolio data that is ready for business as usual.

As described herein, "Kinetic Program Handbook" or "KPH" refers to a how-to guide to build, run and lead a client's specific program/needs. The KPH is integrated via the system to update based on data elsewhere in the system. Further, the KPH can customize artifacts quickly.

As described herein, "Kinetic Transformation" refers to an algorithm or repeatable method for breaking large changes into a series of actions that could be easily customized, measured, and improved through the use of data as part of an end-to-end, integrated process or the Strategy "TO" Execution Lifecycle.

As described herein, a "Kinetic Transformation Algorithm" is summarized in Equation 1:

$$1-(\Delta KTA_e * \Delta KTA_p * \Delta KTA_a) = S \quad \text{[Equation 1]}$$

where,

E=the perfect Environment state that is impossible to achieve (where this number approximates to about 0.97), $KTA_e$=demonstrated level of alignment across strategy, culture, and market and is in a range of about 0.97 to about 0.03 (where 0.03 is the theoretical limit to lack of alignment of the program to the Environment), P=the perfect alignment of People that is impossible to achieve (where this number approximates to about 0.97), $KTA_p$=demonstrated level of alignment, communications, and support among People and is in a range of about 0.97 to about 0.03 (where 0.03 is the theoretical limit to lack of alignment across People), A=the perfect automated state that is impossible to achieve, which approximates to about 0.97, and $KTA_a$=demonstrated level of automation exhibited through a change program and is in a range of about 0.97 to about 0.03 (where 0.03 is the theoretical limit to lack of automation).

It should be appreciated that the objective of any program is to achieve an ever higher rating on Transformation performance, while achieving the stated goals for the program. Act, Learn, Repeat is a way of working through the Stages. The closer the program comes to the ideal states across the measures (generated by periodic KT Assessments), the higher the likelihood for success. Illustrative sample data using Equation 1 may be seen below in Table 1, with the goal being to use Equation 1 to show a company scatter plots of where it's program lies relative to others.

Bringing together variables (e.g., people across different levels of an organization, people in different organizations like contractors and consultants, information systems and diverse processes) fast enough to successfully win at large scale corporate change at the velocity experienced by Kinetic Transformation teams requires technology. The solution that brings together technology and Kinetic Transformation processes is referred to as the "Kinetic Transformation Accelerator" or "KTA" herein. Through this system, many actions performed during Kinetic Transformation Initiatives are automated via a guided workflow that helps a user complete the stages of a Kinetic Work Cycle.

All programs generally have the same four Stages, meaning that one can create generic processes that can be run using the Act, Learn, Repeat ways of working. Act, Learn, Repeat is a way of working through the system. Users or companies that utilize Act, Learn, Repeat are more likely to succeed, as this becomes an ingrained habit. The intensity with which we work is informed by the KTMs and adjusted by the Transformation Lead. The key processes that have been genericized by the instant invention include project intake, prioritization, business case creation, high level planning, detailed planning and hand off to execution teams (end of process).

Moreover, "KTA" is a technology-enabled solution that provides all of the direction and tools needed for a person to behave as a Transformation Lead for virtually any large change program. It accomplishes this by guiding the Transformation Lead in the use of clearly defined Kinetic Work Cycles through an automated, guided workflow that incorporates customized data gathering templates, data gathering systems and tools, system-generated analytical frameworks, and executive reporting artifacts. The data captured is also stored and enriched with psychological insights and other insights as described above. The data is stored in a mechanism that automates production of meaningful analytics. The dataset is optimized for fast integration into other tools and third-party systems, such as workflow automation and project management automation systems. A universal identification ("ID") is a large part of this optimization. The universal ID aligns data against a single concept.

Further, the data is also made available to clients via a custom dashboard that reflects unique, organizational psy-

TABLE 1

Illustrative Sample Data

| F(x) | LOWER Limit | HIGHER Limit | Cycle 1 Start Client | Client Checkpoint 1 | End of Cycle 3 Client Checkpoint 2 | End of Cycle 2 Client Checkpoint 3 | Notes |
|---|---|---|---|---|---|---|---|
| E | 0.97 | 0.97 | 0.97 | 0.97 | 0.97 | 0.97 | Constant |
| KTAe | 0.03 | 0.97 | 0.1 | 0.2 | 0.3 | 0.9 | Higher the better |
| ΔE | 0.94 | 0 | 0.87 | 0.77 | 0.67 | 0.07 | Lower the better |
| P | 0.97 | 0.97 | 0.97 | 0.97 | 0.97 | 0.97 | Constant |
| KTAp | 0.03 | 0.97 | 0.2 | 0.1 | 0.3 | 0.9 | Higher the better |
| ΔP | 0.94 | 0 | 0.77 | 0.87 | 0.67 | 0.07 | Lower the better |
| A | 0.97 | 0.97 | 0.97 | 0.97 | 0.97 | 0.97 | Constant |
| KTAa | 0.03 | 0.97 | 0.1 | 0.3 | 0.5 | 0.9 | Higher the better |
| ΔA | 0.94 | 0 | 0.87 | 0.67 | 0.47 | 0.07 | Lower the better |
| S | 0.169416 | 1 | 0.417187 | 0.551167 | 0.789017 | 0.999657 | 1- (ΔKTAe*ΔKTAp*ΔKTAa) S - success measure. Lower measure - lower likelihood to beat the 70% |
| | | | | % increase 32% | % increase 43% | % increase 27% | | chology and leading practice consulting insights and measures. This data is incorporated into the aforementioned workflow so that the data is useable sooner than with traditional approaches. Additionally, this data is also anonymized and enriched with additional analytics and refined into macro-reporting. Collectively, the primary "use cases" for KTA include: a guided workflow, an automated data capture (e.g., the "front end"), production of the client-facing and market-facing outcomes, data enrichment (e.g., the "back end"), dashboard reporting, and macro-level data analysis and reporting.

As described herein, "KTA data lake" refers to a master data source of all projects. This single, central dataset, is created as a feature of the Kinetic Work Cycle and is integrated into processes and presentations, which ultimately can be used to automate stand up of other third-party systems enriched with Kinetic Transformation data.

As described herein, "Kinetic Transformation Dashboard" or "KPD" refers to aggregated data from across an organization's transformation program(s) with drill-down reporting and custom Kinetic Transformation Metrics or KTMs. The KPD is a repository that may store working papers, data requests (or "DRs") and custom reports.

As described herein, "Kinetic Work Lane" refers to a series of actions that an organization typically follows after an idea is created, but before it can be delivered. These steps may become more or less involved depending on a variety of factors and are relevant to both large program leadership and business as usual (e.g. if used on a large project like a large technology implementation as compared to an annual strategic planning process that may occur multiple times a year).

Further, according to Kinetic Transformation, the Kinetic Work Lane occurs anytime there is a large change program or an organization wants to create alignment for delivery of work at scale, such as when work must run through a prioritization funnel. KTA guides the Transformation Lead through stand up of a custom Strategy "TO" Execution Value Chain and respective processes using a guided workflow, automated data capture, and data integration. KTMs, in particular, are used to distill valuable cultural and "people-based" learnings, as well as learnings about organization composition, risk management, and other metrics. The automated Strategy TO" Execution flow is then used to translate these learnings into direct actions, such as change management interventions or project actions. Because these actions arise as part of a change program delivered via Kinetic Work Cycles, the actions become standardized, templatized, and pushed through KTA's Project Management process. Because the integrated data generation, capture, and adjustment (e.g., the Act, Learn, Repeat) feeds directly to KTA's Program Management Office (PMO), program success, opportunities for improvement and many other vital key performance indicators can be measured with precision and reported back to the client via custom reports and/or dashboards.

As described herein, "Milestone" refers to a specific point in time where a measurable outcome, such as a presentation or delivery of code, is shared for input and decision-making. To designate an outcome as a milestone, it must have an owner, have a due date, and drive decision-making. To achieve a milestone, an outcome must be shared with key stakeholders, including a Steering Committee and must include a tangible product, such as a presentation.

As described herein, an "Operating Committee" refers to a formal governing body that includes all work stream leads supported by resources as the work stream leads decide. An Operating Committee is often most useful on programs that have heavy functional silos.

As described herein, "Steering Committee" refers to program decision makers and includes the Client Sponsor.

As described herein, "Strategy 'TO' Execution" or "Strategy 'TO' Execution Value Chain" refers to the concept that all transformations begin with an idea, are converted into tangible projects, are prioritized as a function of resources, time, and understanding of outcome, and then once a decision is made, head down execution via the most efficient means possible so as to conserve resources and avoid distraction.

As described herein "Transformations" or "Transformation Initiatives" refers to large and complex programs that result in substantial changes to how a product or service is experienced by customers in a market or organization. In some examples, Transformation Initiatives may include deals, like mergers or carve outs. In other examples, Transformation Initiatives may include operating model changes, such as changes to reporting relationships or interactions between people, systems and processes or large-scale system implementations such as when a large company implements a new technology such as an Enterprise Resource Planning (ERP) system. Other examples of Transformation Initiatives include (1) forced transformations (which include items an organization has to do, such as comply with new regulations, engage in a merger, acquisition, or audit, etc.), (2) market transformations (which a company may want to do to stay relevant, such as offering new products, entering a new market, etc.), (3) get better transformations (which a company may want to do to be more profitable, such as organization restructuring, etc.), and (4) digital transformations (where a company may want to use technology to create a more meaningful customer experience, such as marketing transformations, carve outs, etc.).

As described herein, "Transformation Arbitrage" refers to an oversized return from change effort executed by a company, which is summarized by Equation 2:

$$TA=(S)*(p)*(Ef), \quad \text{[Equation 2]}$$

where,

S=the result of Equation 1, p=Momentum (p=mv), m=program mass (between 1 and 5, with 1 being the lowest and 5 being the highest), v=velocity (between 1 and 5, with 1 being the slowest and 5 being the fastest), Ef=Efficiency (input/output), where input=spend and output=ROI, T=Transformation multiplier (which is between about 0.97 to about 0.03), TA=Transformation Arbitrage.

Put another way, Equation 2 refers to efficiency resulting from standardization multiplied by the increased speed of action and momentum attributable to Transformation (or "T"), which results in Transformation Arbitrage or an outsized return through Transformation. Equation 2 may be used to show a client points in time to illustrate the impact S is having and how to correct such impact. Illustrative sample data using Equation 2 may be seen below in Table 2.

TABLE 2

| Equation | Symbols | S &A | Self-done | Other Consultancy | Notes |
|---|---|---|---|---|---|
| Ef = Input/Output | Efficiency | 40 | 16.66666667 | 10 | |
| | Input (spend) | $ 250,000 | $ 150,000 | $ 1,000,000 | |
| | Output (ROI) | $ 10,000,000 | $ 2,500,000 | $ 10,000,000 | |
| p = m*v | Momentum = p | 12 | 20 | 15 | |
| | Program Mass (m) (1-5, 1 lowest, 5 highest) | 4 | 5 | 5 | Mass is a qualitative measure for now but will become quantitative as we gain data |
| | Velocity (v) (1-5; 1 slowest, 5 fastest) | 3 | 4 | 3 | Velocity is a qualitative measure for now but will become quantitative as we gain data |
| S | | 0.417187 | 0.417187 | 0.417187 | |
| TA = S*p*Ef | S*P*F = TA | 200.24976 | 139.0623333 | 62.57805 | Transformation Arbitrage; irrational return from change Over time we will develop context for this number and how it translates |

As described herein, "Transformation Consulting" and/or large-scale change program leadership includes activities of a professional nature that support efforts to deliver large change programs in organizations, which are also known as "Transformations" ~ or "Transformation Initiatives."

As described herein, "Transformation Lead" refers to a person responsible for leading the team through the change program.

As described herein, "Value Chain" refers to a cross-functional process that works together across tasks to deliver an output/product.

As described herein, "Work Stream" refers to a temporary, cross-functional work group, that delivers a specific outcome.

Invention

The present invention provides a unique consulting model that blends a traditional consulting approach with organizational psychology to deliver change programs with lasting benefits to businesses. Also, the present invention provides a proprietary approach for delivering large-scale change programs and is built on an "Act, Learn, Repeat" way of working that stresses using data to tailor the approach throughout the life of the program. The instant invention provides a turnkey service that helps clients quickly: (1) assess their program or project, (2) identify key success factors and risks, (3) accelerate program stand up, and (4) scale and achieve business as usual.

In particular, and as shown in FIG. 1, the present invention provides a method executed by an engine 108 (or a KTA engine 108) on a computing device 104 for providing a "psychological-based approach for organizational growth" of a business 186. In examples, the KTA engine 108 includes an artificial intelligence (AI) component 184 and at least one algorithm 196. It should be appreciated that in other examples, the KTA engine 108 may be an application, a software program, a service, or a software platform executable on the computing device 104. Further, the at least one algorithm 196 may comprise the Kinetic Transformation Algorithm (or the KTA) of Equation 1.

Generally, the method described herein focuses on the following process steps: capturing data, combining data with other data to create a data set, outputting the data set, utilizing the data set to form hypotheses to address one or more problems associated with a project, taking one or more actions based on the hypotheses to address the one or more problems associated with the project, measuring or analyzing the results of the actions and modifying one or more steps, based on the results of the actions. This method may be repetitive until the desired results are achieved.

General Process Steps

More specifically, the method includes assessing a current project (e.g., a project 188 of FIG. 1) for the business 186 to identify key success factors, risks, and potential problems (e.g., an assessment process step 112 of FIG. 2-FIG. 6 and FIG. 8-FIG. 13, or a KTA step). This process step may include capturing data associated with the project 188 of the business 186 continuously and in real-time. In some embodiments, the project 188 is a change project for the business 186. In examples and as shown in FIG. 1, the project 188 includes sub-projects, such as a sub-project A 190 and/or a sub-project B 192, among others not explicitly listed herein. In an example, the sub-project A 190 and the sub-project B 192 may be working with the same technology and may have the same risk of this technology failing, which will have a drastic effect across the program or project 188. The present invention helps employees (e.g., project managers) identify these kinds of risks earlier to plan accordingly. Further, in some examples, for the project 188, there are repeatable project tasks, like tracking interdependencies, that all projects require. This is very labor intensive and often results in mitigating actions, like getting more resources or change management. The present invention seeks to reduce this.

It should be appreciated that the data described herein may be described by multiple methods, such as traditional data capture methods. In some examples, the data may be captured by providing the customer 102 with questions via a graphical user interface (GUI) 110 (of FIG. 1) of the computing device 104 and receiving a response to each of the questions via the GUI 110. In examples, the questions may be associated with employees of the business 186, a culture of the business 186, goals associated with the project 188, and/or budgets associated with the project 188. The data may also be captured from the existing infrastructure by using an application programming interface (API) 118 (of FIG. 4). Then, the data is used to drive downstream decision making and resource focus.

This captured data may be combined with data from other sources to create a data set. Further, it should be appreciated that the assessment process step 112 includes not only engaging in the KTA, but also determining a detailed workplan and approach to understand the needs of a client/customer 102, set goals, and customize the approach accordingly to meet the goals of the client/customer 102. For example, the method may include: utilizing the data set to better predict and drive a resolution of one or more problems associated with the project 188. The one or more problems include a location factor associated with where the one or more problems are predicted to arise and a timing factor associated with when the one or more problems are predicted to occur. More specifically, the dataset may be used to drive critical mass for AI, which will be used to better identify and resolve program risks/issues. This result leads to better rates of risk resolution and risk avoidance.

It should be appreciated that all of the data described herein may be stored in a database 106 of the system of FIG. 1. Further, in some examples described herein, the software or the KTA engine 108 will be a standalone software package that provides the customer 102 with step by step instructions and tools for the workflow described herein. In some examples, the present invention also provides a certification process for experts utilizing the KTA engine 108.

Figure 4:
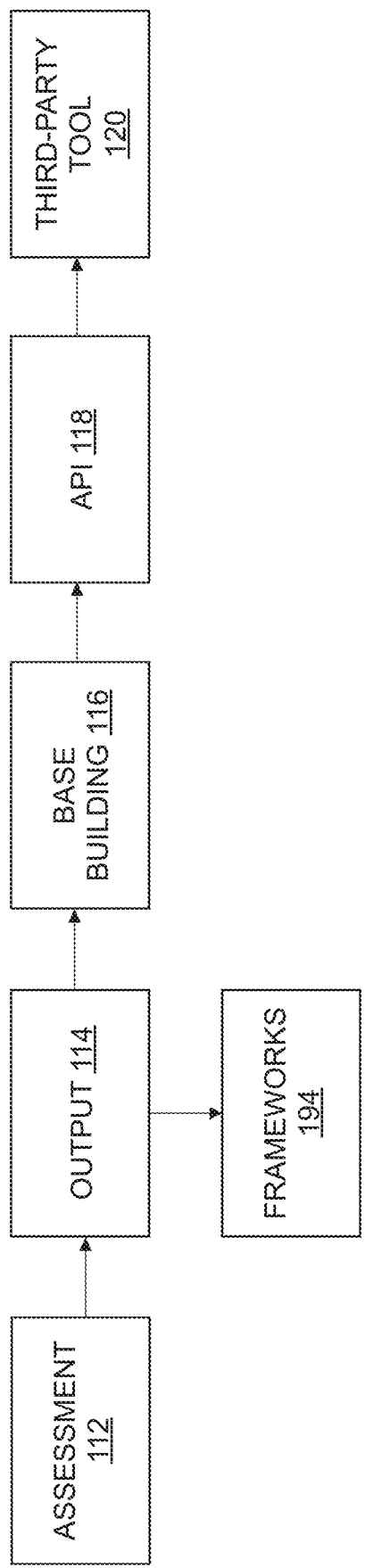
FIG. 4 depicts a block diagram of a method executed by a system, in accordance with embodiments of the present invention.

The method also includes outputting multiple frameworks 194 (of FIG. 4) to be used to address and overcome the problems (e.g., an output process step 114 of FIG. 4). Each of the multiple frameworks 194 are user-customizable. Furthermore, the multiple frameworks 194 promote transparency and consistency across meetings and decision sessions for the business 186. Moreover, each of the multiple frameworks 194 provides the customer 102 with a method to address the one or more problems, which may include information regarding the change, an identification of key success factors, an identification of early risks and pitfalls, and/or steps or instructions on how to modify aspects of the business.

Next, the method includes: receiving a selection from the user 102 of a framework from the multiple frameworks 194 to address the one or more problems and executing a base build/intake process (e.g., a base build process step 116 of FIG. 2-FIG. 6 and FIG. 14-FIG. 16) using a framework of the multiple frameworks 194 to address and overcome the problems.

Figure 2:
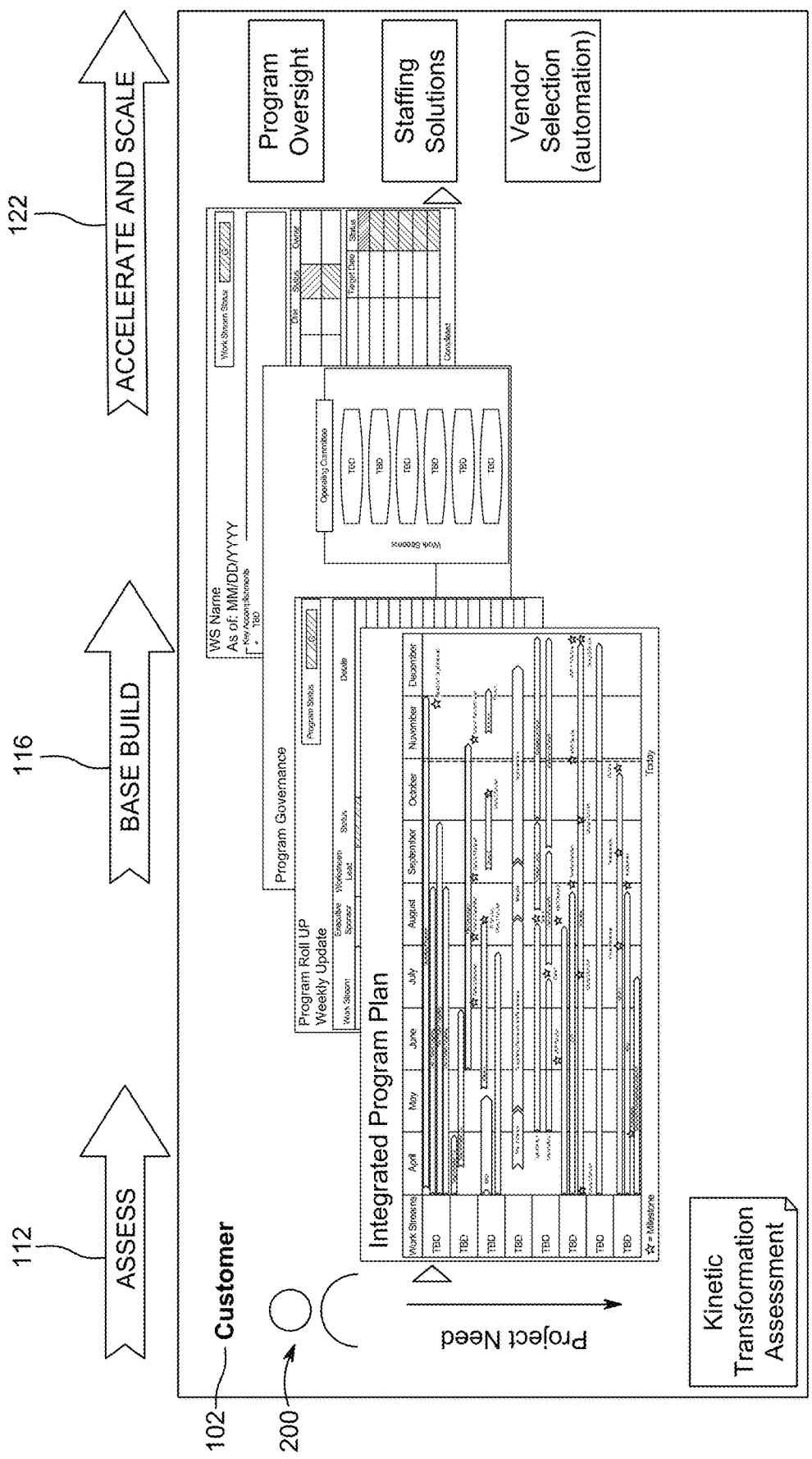
FIG. 2 depicts a schematic diagram of a system, in accordance with embodiments of the present invention.

As shown in FIG. 2, the method may further include a process step to accelerate and scale the solution 122, which may include overseeing the program, providing scaffolding solutions, and/or providing vendor selection or automation resources. However, in some embodiments, and as shown in at least FIG. 3 and FIG. 5-FIG. 6, this process step may be replaced by (4a) and Execute process step 216 and (4b) a scale process step 218. The (4a) Execute process step 216 includes piloting a planning sequence and delivering results to test processes and engage the team. The (4b) scale process step 218 includes improving the program and selecting the system to expand the scope and create a plan. Moreover, the (4b) scale process step 218 includes gathering feedback and data, determining what (if anything) needs to be added or addressed next with regards to the programs scope.

The method may also optionally include providing advisory services and/or expert consulting services to the customer 102 or to the business 186 for a fee. Such fee may be on a weekly fee, a monthly fee, an annual fee, or a one-time basis fee, among other fee structures not explicitly listed herein. Moreover, the method may optionally include: utilizing the API 118 or third-party product or tool 120 (of FIG. 4) to automate use of the dataset in an ongoing fashion. Optionally, the present invention also provides the ability for the customer 102 to customize reports built on the transformation data. These reports can be generated in any fashion known to those having ordinary skill in the art.

Kinetic Work Cycle

Figure 3:
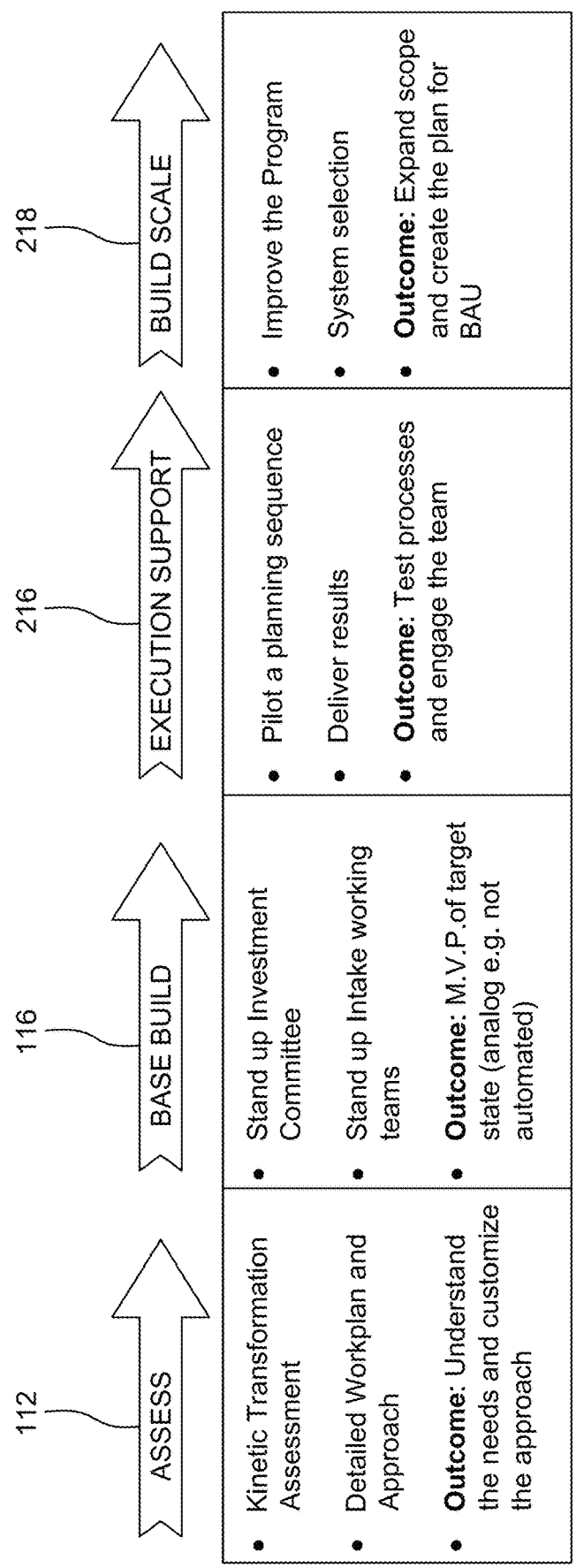
FIG. 3 depicts a schematic diagram of a Kinetic Work Cycle, in accordance with embodiments of the present invention.

Specifically, FIG. 3 depicts an example of a typical Kinetic Work Cycle. Using this more sprint-based approach of FIG. 3, a large change event becomes bite-sized so the team can absorb what is happening, plan a course of action, deliver outcomes and capture data to improve the program for scale or taking on more of the program as it evolves. The Kinetic Work Cycle brings clarity and transparency to often complex situations. Kinetic Transformation is an approach to change. The Kinetic Work Cycle is used to help simplify what is referred to as the "Strategy 'TO' Execution" lifecycle. Further, the Kinetic Work Cycle provides stability and reduces confusion and resource fatigue.

Figure 5:
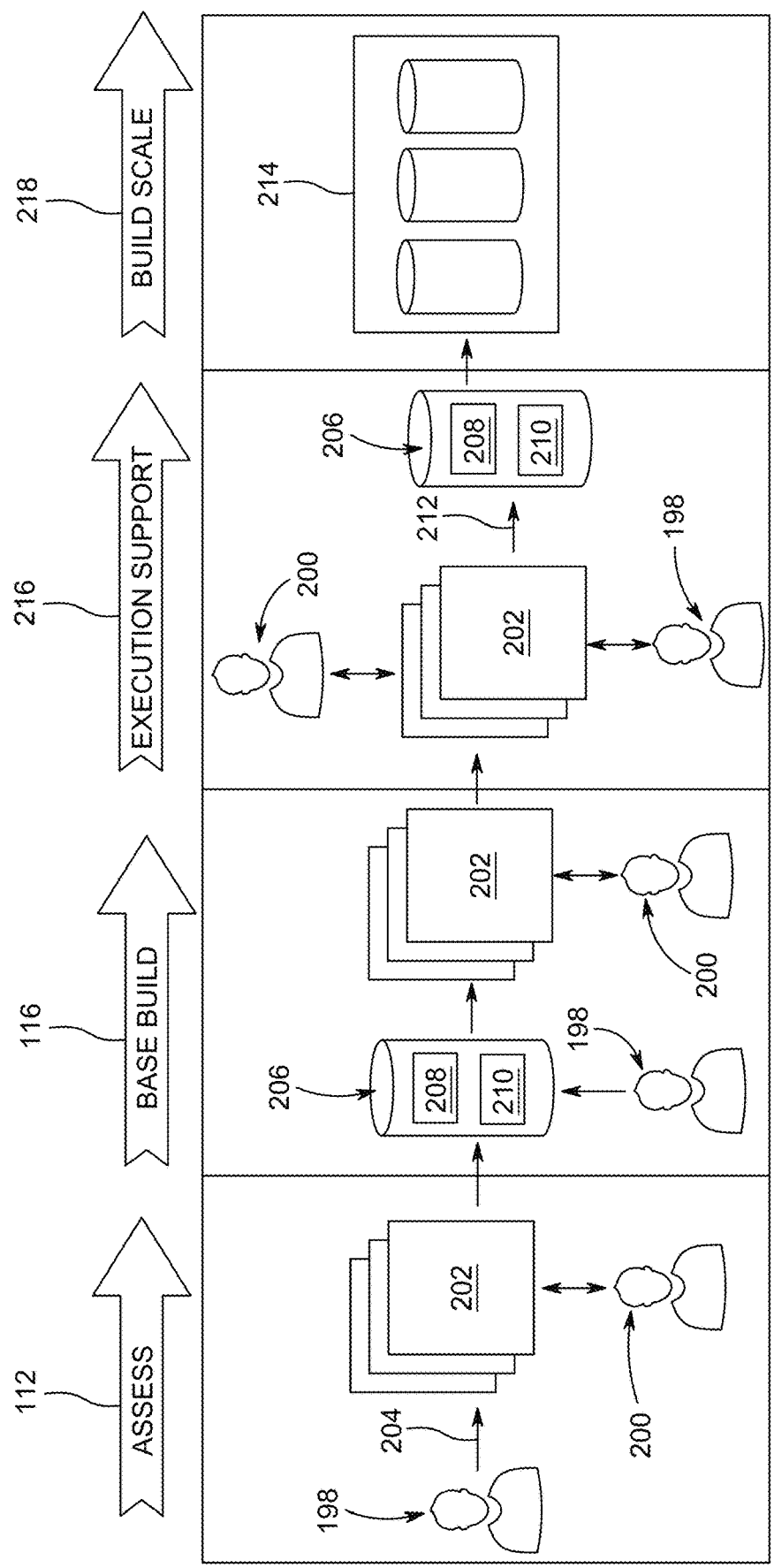
FIG. 5 depicts a schematic diagram associated with the process steps of: Assessing, Base Building, Executing, and Scaling, in accordance with embodiments of the present invention.

FIG. 5 depicts a schematic diagram associated with the process steps of: Assessing, Base Building, Executing, and Scaling, in accordance with embodiments of the present invention. Specifically, during the assessment process step 112, a consultant 198 (deemed "Kinsultant") grooms a central questionnaire and shares select questions with people to complete data requests in the system. The consultant 198 may interact with the back end of the system, while a client/customer 200 may interact with the GUI 110. The consultant 198 enriches the feedback from the client/customer 200 with KTMs (e.g., at a process step 204) and these KTMs are updated as the consultant 198 deems necessary. The client/customer 200 may engage the dashboard 202 to templatize data entry and/or messaging.

During the base build process step 116, a KTA cloud database 206 stores KPFs 208 (e.g., in an excel spreadsheet format) and a KPH 210 (e.g., in a PowerPoint format). It should be appreciated that other formats are contemplated herein, such as AWS/WordPress, and others. The consultant 198 may interact with the artifacts via some GUI and may also modify/customize the KPFs 208 and/or the KPH 210. The client/customer 200 may engage the dashboard 202 to templatize data entry and/or messaging during this process step.

Next, during the execute process step 216, the client/customer 200 may engage the dashboard 202 to templatize data entry and/or messaging. The consultant 198 may provide KTMs and/or reporting to the dashboard 202. ETL/a custom API then progresses the process step to the KTA cloud database 206, which houses the KPFs 208 and the KPH 210. The scale process step 218 then engages a third-party system 214.

Strategy "TO" Execution Value Chain

Figure 6:
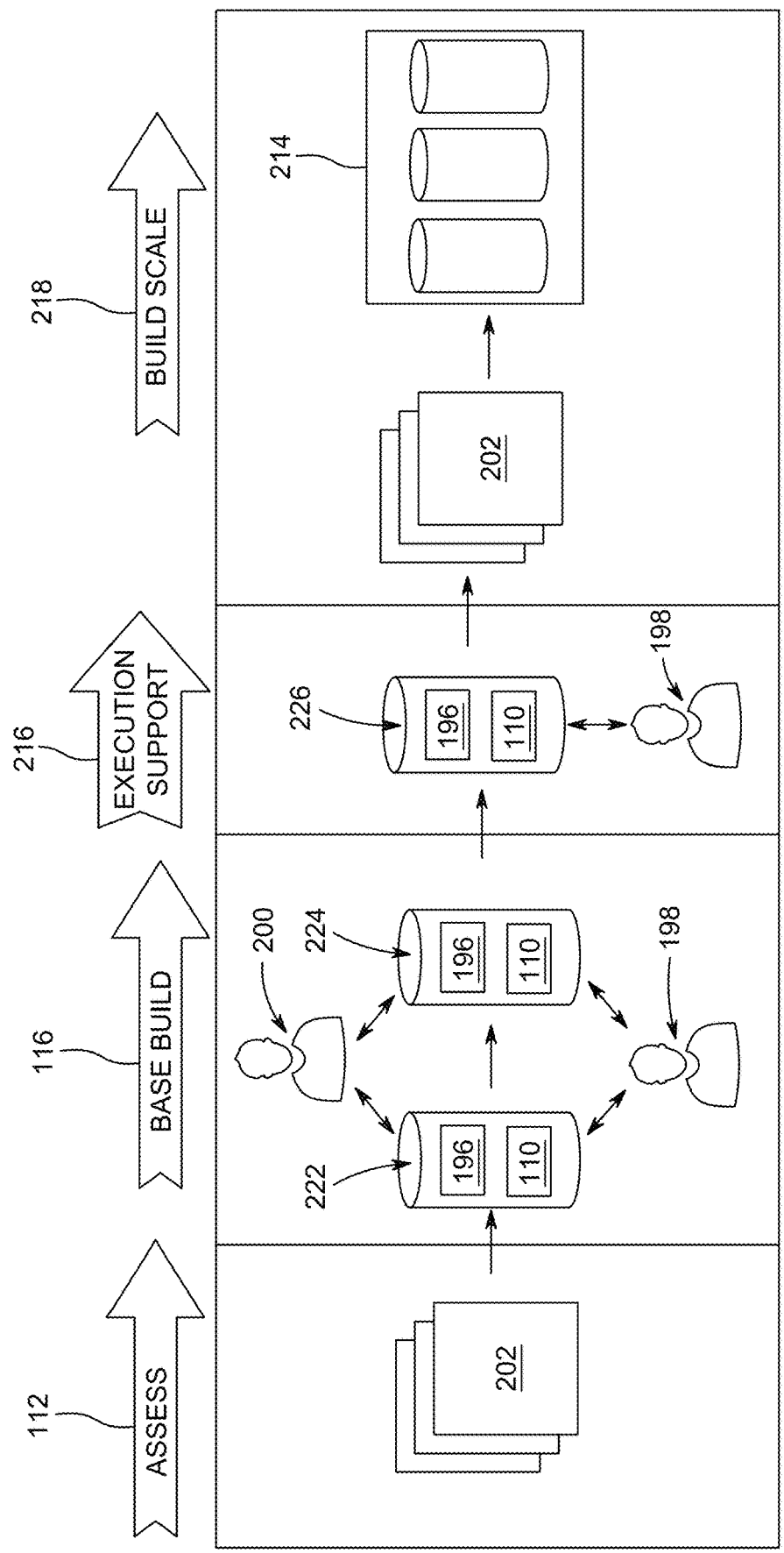
FIG. 6 depicts a schematic diagram depicting a stand up of a Strategy "TO" Execution Value Chain, in accordance with embodiments of the present invention.

FIG. 6 depicts a schematic diagram depicting stand up of a Strategy "TO" Execution Value Chain. As shown in FIG. 6, during the base build process step 116, each of the consultant 198 and the client/customer 200 are configured to enter data into a governance model creator engine 222 and/or a process creator engine 224. The consultant 198 may interact with the back end of the system, while the a client/customer 200 may interact with the GUI 110. Each of the governance model creator engine 222 and the process creator engine 224 include the GUI 110 and the algorithm 196. During the execute process step 216, the consultant 198 is configured to engage a change and action module or engine 226, which includes the GUI 110 and the algorithm 196. The scale process step 218 engages the dashboard 202 and then the third-party system 214.

Process to Aggregate and Enrich Data at Scale

Figure 7:
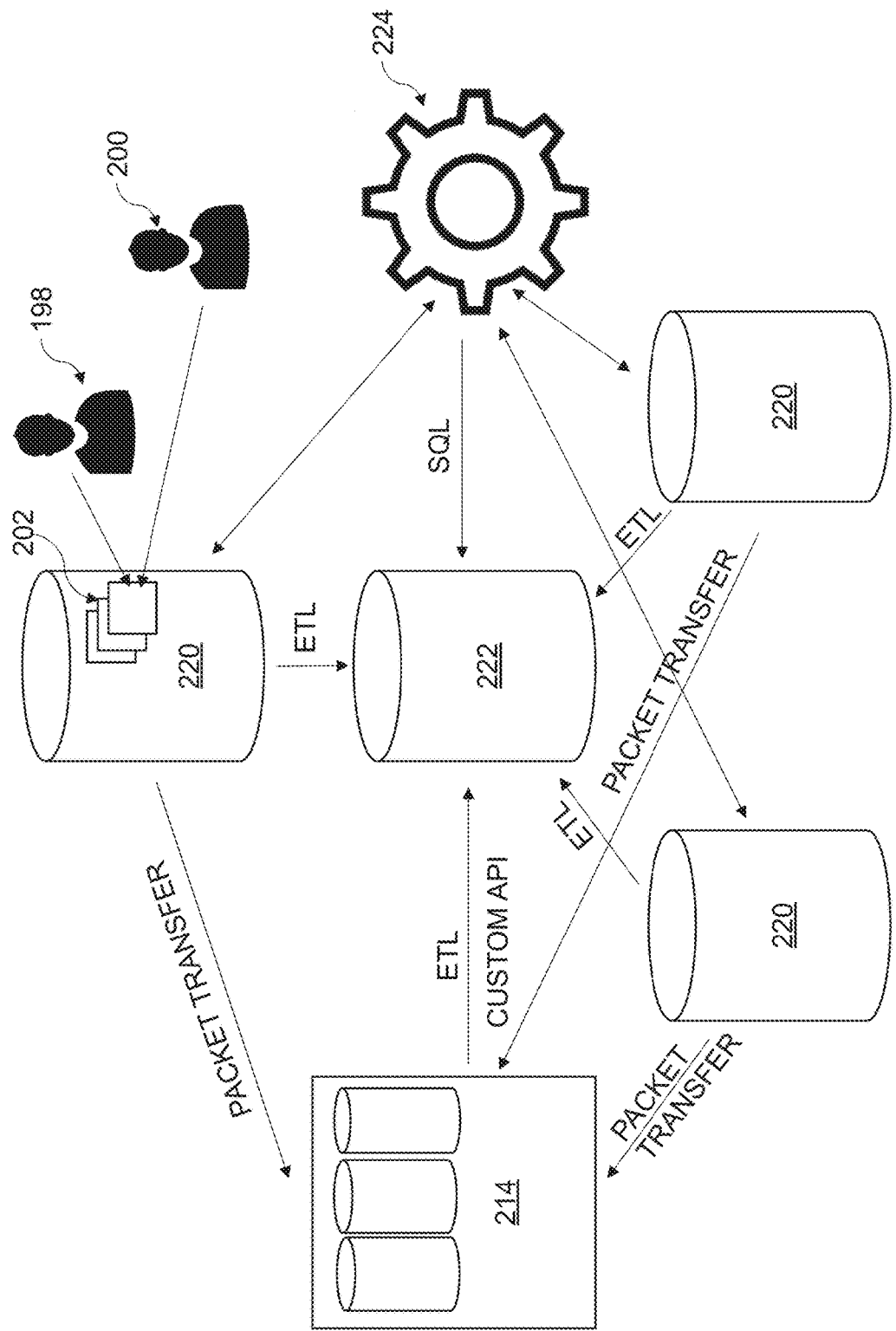
FIG. 7 depicts a schematic diagram associated with a process to aggregate and enrich data at scale, in accordance with embodiments of the present invention.

FIG. 7 depicts a schematic diagram associated with a process to aggregate and enrich data at scale. Specifically, FIG. 7 illustrates a multi-tenant architecture and depicts numerous KTA client instances 220 that include the dashboard 202. It should be appreciated that though only three KTA client instances 220 are depicted, the quantity of the KTA client instances 220 is not limited to such. FIG. 7 also depicts a KTA data lake 222, the third-party system 214, and a KTA D&A engine 224. The consultant 198 and the client/customer 200 are configured to engage the dashboard 202. The different transfers are depicted by arrows in FIG. 7. It should be appreciated that data from across clients is never sent directly to the client/customer 200—it is always scrubbed via an exact, transform, load process (or ETL process) into the KTA data lake 222 and the interaction between the KTA D&A engine 224 and the client/customer 200.

The unique data architecture, gathering, and enrichment process of the system enables unique use and manipulation of the data. More specifically, data from across clients, programs and projects can be genericized and anonymized in KTA into a single data lake (e.g., the KTA data lake 222) that generates custom and general market data and analytics concerning change and transformation programs.

Detailed Description of the Process Steps

As described herein, KTA is built on a proprietary program management and change management methodology, known as Kinetic Transformation or. KTA helps the client/customer 200, using a four-part approach described herein, including: (1) assessing or understanding the program or function in the environment in which it lives (e.g., the assessment process step 112), (2) base building or prototyping processes and governance structures to run the program/function (e.g., the base build process step 116), (3) executing the delivery or testing of the base build (e.g., the execute process step 216), and (4) scaling or automating the base build and the program management via a leading tool (e.g., the scale process step 218). Each of these process steps will be discussed in detail herein.

Figure 11:
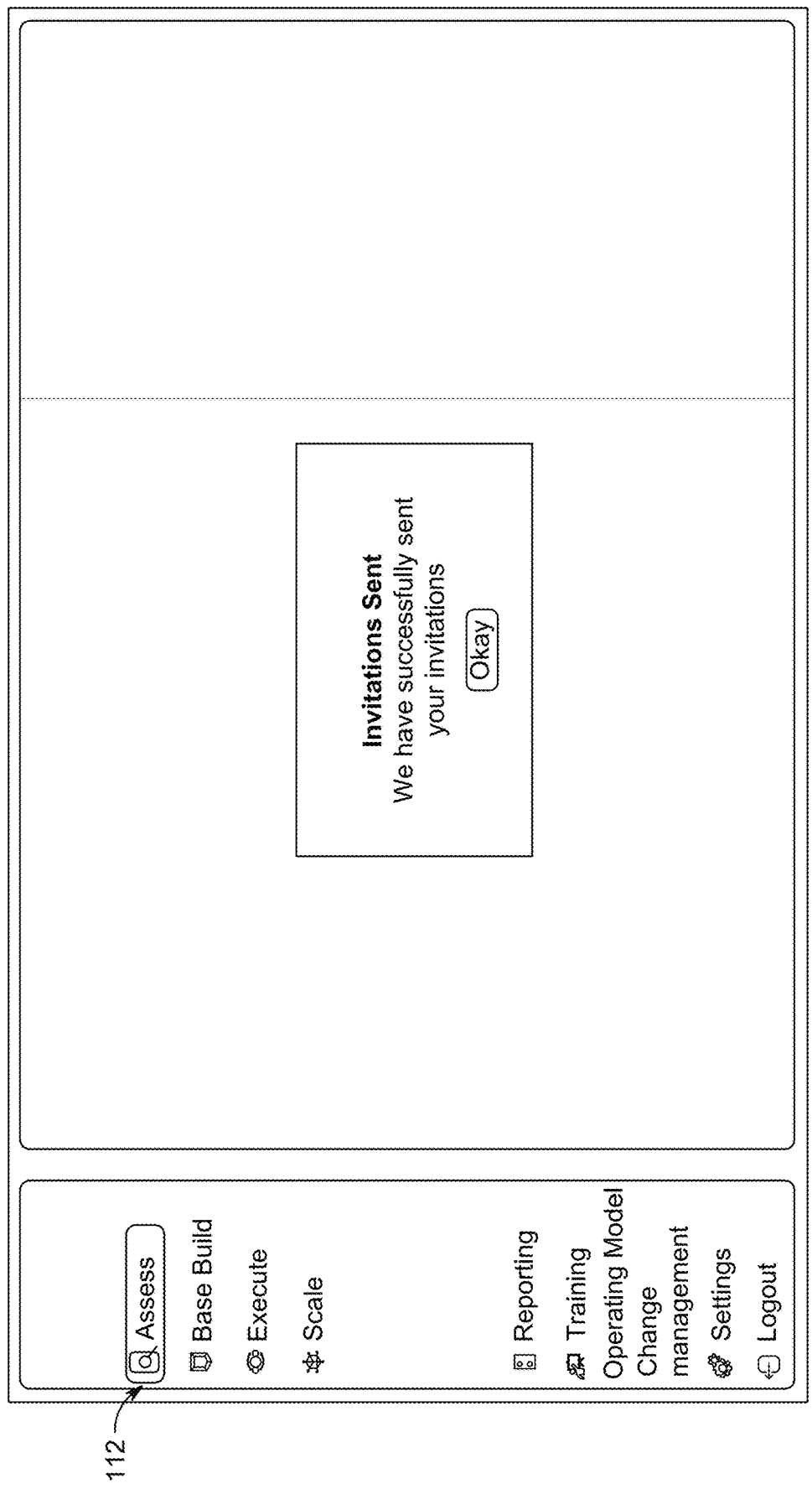
FIG. 11 depicts a schematic diagram showing invitations sent via a KTA, in accordance with embodiments of the present invention.
Figure 13:
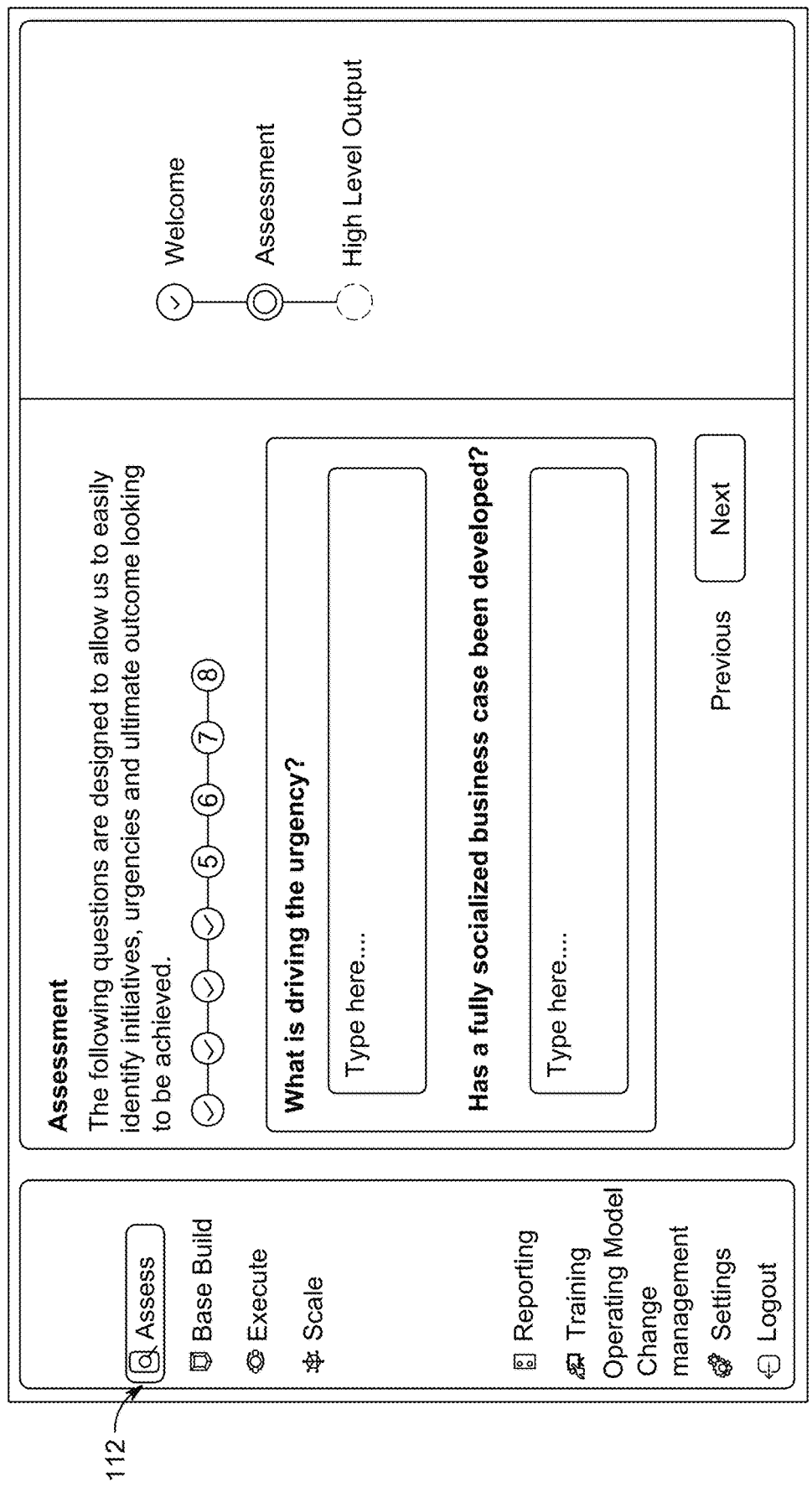
FIG. 13 depicts another schematic diagram showing a ratings screen for an assessment of a KTA, in accordance with embodiments of the present invention.

Further, while using the KTA system, the Kinetic Work Cycles are now predictable, standard events. The KTA's guided workflow incorporates an integrated data capture/interaction model to systematize what data is captured, when, and how. For example, FIG. 9 provides a webform screen sample layout with a guided data entry for the client/customer 200, FIG. 10 and FIG. 11 provide a webform screen sample layout with invitation for virtual data entry for the client/customer 200, and FIG. 12 and FIG. 13 provide a webform screen sample layout with sample psychology datapoints. In this way, duplicative tasks are avoided and the system becomes a place of record for alignment and common language (e.g., FIG. 5-FIG. 7 for additional detail about how this process is integrated into the Kinetic Work Cycle). It should further be appreciated that FIG. 9 may also apply to post-incarceration settings or anything client-specific.

The Assessment Process Step 112

Figure 8:
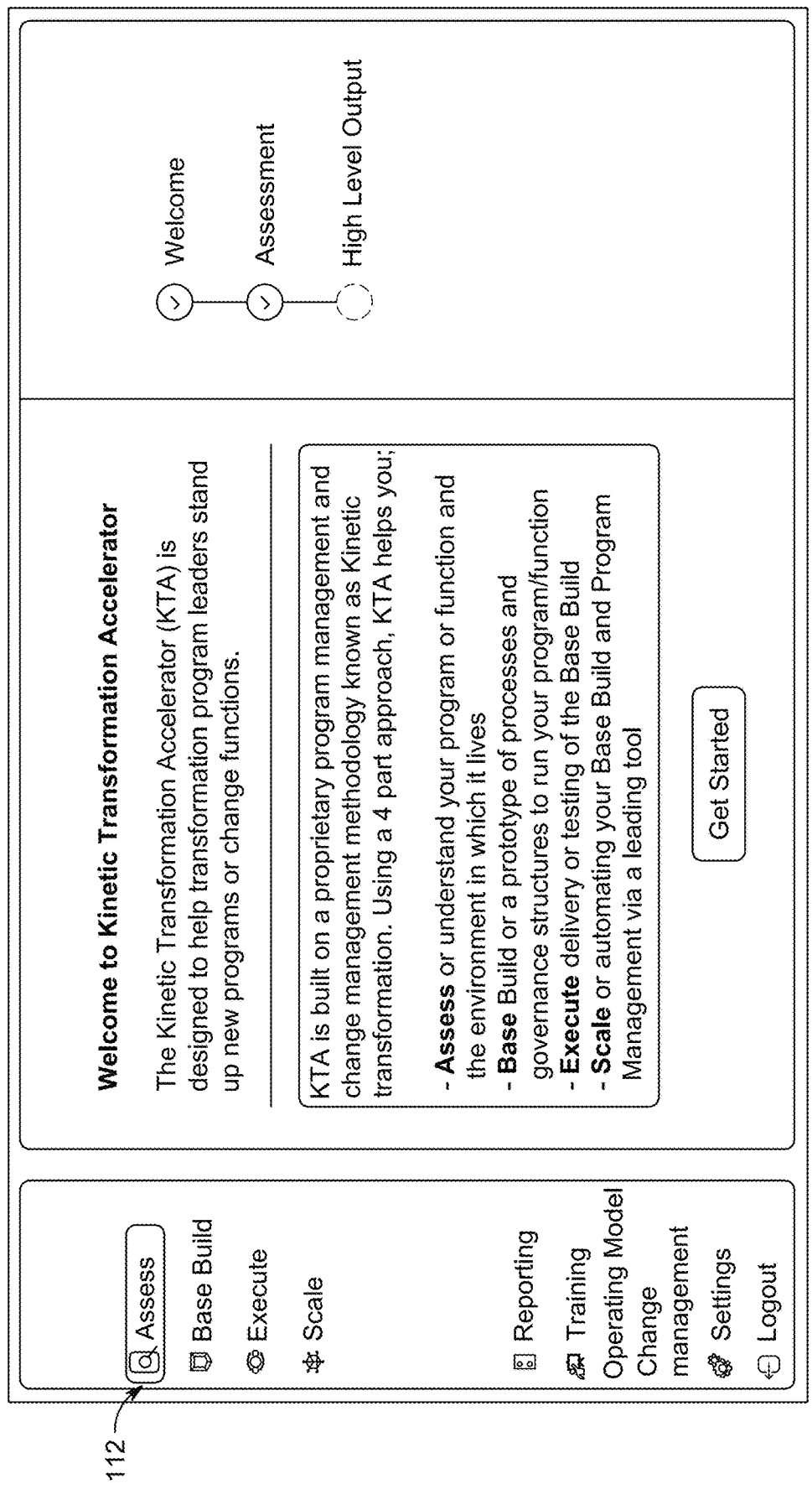
FIG. 8 depicts a schematic diagram associated with a home screen of a Kinetic Transformation Accelerator (KTA), in accordance with embodiments of the present invention.

FIG. 8-FIG. 16 depict schematic diagrams associated with customer/user views of KTA executed on the computing device 104. Specifically, FIG. 8 depicts a schematic diagram associated with a home screen of the assessment process step 112 of the KTA. This home screen welcomes the client/customer 200 to KTA. During the assessment process step 112, the Kinetic Transformation work team will begin by conducting a thorough discovery with an emphasis on understanding the change about to take place.

The KTA engine 108 utilizes Kinetic Transformation to guide the discovery process through a framework known as the "Understanding the Change" framework. This framework looks at environmental factors (e.g., change context and transformation type), organizational factors (e.g., culture and capabilities), leadership factors (e.g., alignment and support), people (e.g., capabilities and relationships), and communication (e.g., motivation and messaging). Each area in the framework is understood through a series of data gathering questions provided by KTA engine 108 to the client/customer 200 that include standard, industry practice questions asked across multiple professional disciplines like Change Management, Project/Program Management and Organization design. The KTA engine 108 utilizes customizable templates to guide the client/customer 200 through question/answer sessions and capture the information via web forms/HTML.

Next, the KTA engine 108 organizes the data into a structure using "Transformation Language" or standard terms frequently used in the course of day-to-day activities during a large change program by a specific client. For example "Project Name" or knowing the names of the projects supporting the work in the program are critical data points that are frequently required throughout the life of any program. By identifying these terms and indexing them with a unique identifier, data that is frequently needed is made available for use in a variety of forms. One such example is providing automated frameworks for analyzing data and providing insights to further inform and advance the program's mission. Because the Kinetic Work Cycle is predictable, the skilled client/customer 200 can generate the same analyses and approaches such as when analyzing a large program's data in aggregate for the purposes of forming an opinion or recommendation.

Moreover, during this process step, the client/customer 200 may also be prompted to input a list of key stakeholders, including their name, title, email address, telephone number, area of influence, number of reports, etc., as shown in FIG. 9. FIG. 10 also depicts a screen that allows the client/customer 200 to provide the names of individuals who can provide additional perspective on this project. Once selected, invitations are sent to those individuals, as shown in FIG. 11. The invitations may be transmitted to the selected individuals via numerous communication means, such as email communication, text messaging, etc.

The assessment process step 112 concludes with an updated, specific workplan presented via the GUI 110 to the client/customer 200. This workplan is designed to provide detailed, measurable outcomes and actions over the course of the Kinetic Work Cycle. Again, by leveraging the standardization of the Kinetic Work Cycle and integrated data capture, the KTA engine 108 can automate previously complex tasks, like generating these integrated program plans. Because complex change programs are now more manageable sprints, designed to deliver, test and improve, everything is outcome-oriented and builds on the previous cycle at the leader's discretion, such as depicted in FIG. 22.

The standardization and integration of the workplan's Stage->Milestone or Deliverable->Status structure is designed as a data archetype that is expanded upon throughout the other aspects of the system, such as population of the KPF. This occurs through standardizing terms, relational databases and all united by a unique identifier.

Moreover, during this process step, the data captured may be enriched. For example, an advising team (such as the program lead, consultant, etc.) may utilize a combination of meetings and the automated data capture/messaging process described herein to efficiently gather data and structure it in the system while using the opportunity to build relationships with key stakeholders and constituents. These interpersonal interactions, whether face-to-face or via the system, represent vital learning opportunities to capture detailed data about areas that can have a disproportionate impact on the program, but may not be readily available. One such example is organizational "culture." This amorphous concept is commonly viewed as one of the most vital drivers of an organization's success and yet it is difficult for practitioners to put their finger on a single definition of what it is or how to measure it. Through the system, one can facilitate data capture and enrichment according to the KTMs during the time of discovery. Since the data is captured as part of an integrated end to end Strategy "TO" Execution Value Chain, these insights can quickly become measured actions that can be adjusted and refined until they result in success or beating the 70% fail rate. These insights, in context with the added benefit of system automation, turn insight into action.

The Base Build Process Step 116

Figure 14:
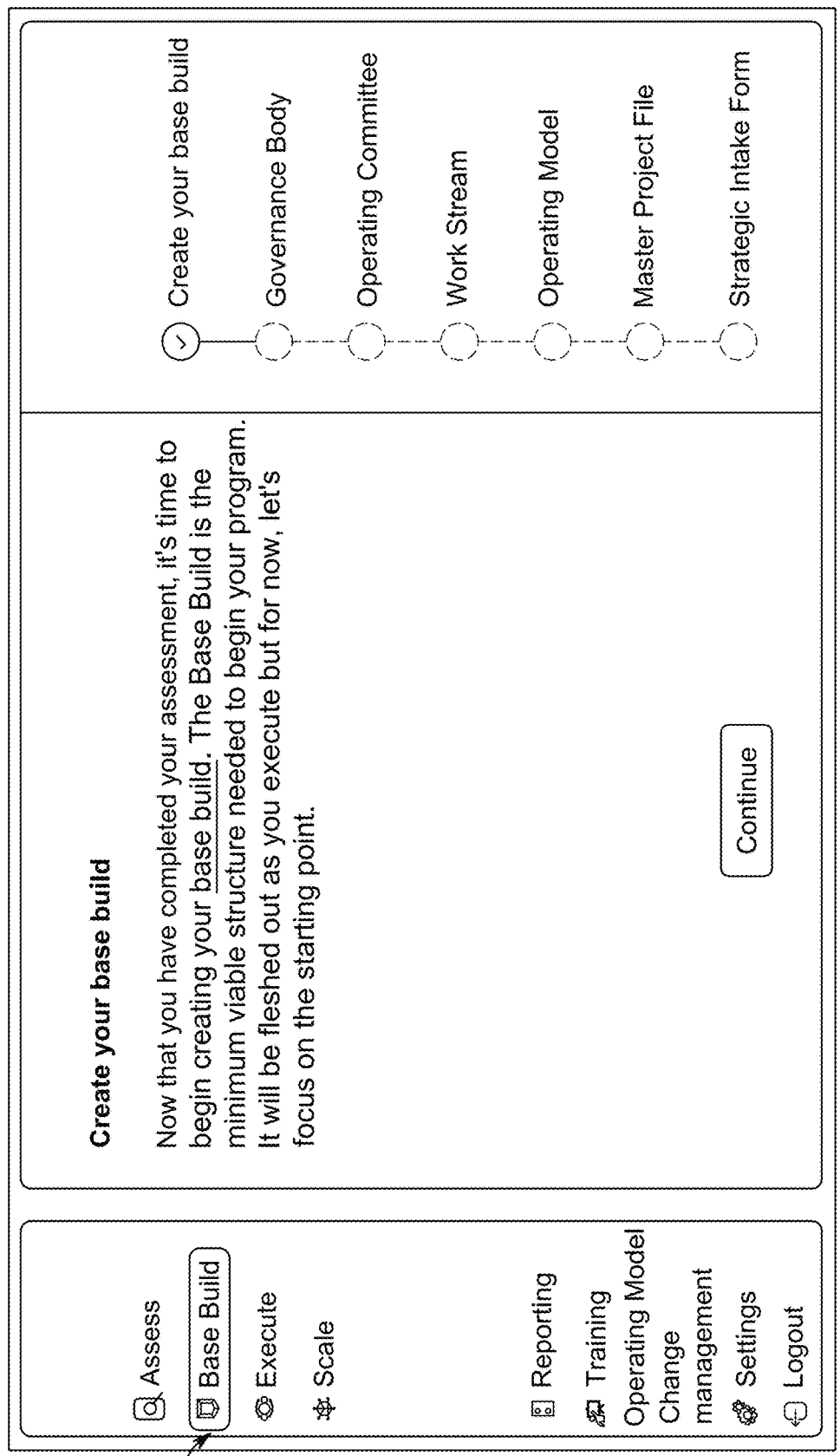
FIG. 14 depicts a schematic diagram showing a base build creation screen of a KTA, in accordance with embodiments of the present invention.
Figure 15:
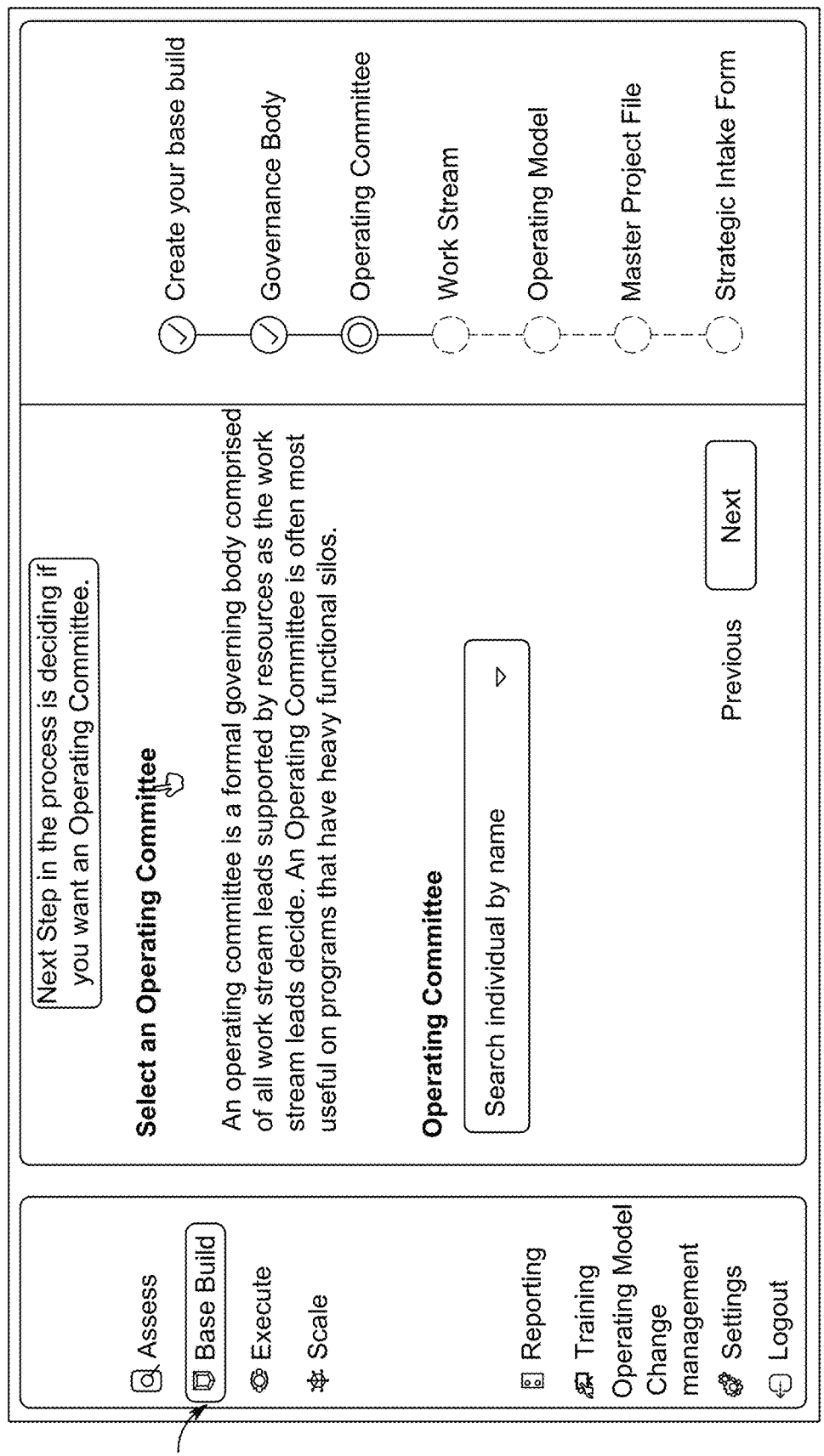
FIG. 15 depicts a schematic diagram showing a KTA of a system for use selecting an operating committee, in accordance with embodiments of the present invention.

Moreover, once the assessment process step 112 is completed, the method moves onto the base build process step 116, as shown in FIG. 14. Once the data is captured, the KTA engine 108 guides the client/customer 200 through actions, like meetings to discuss recommendations with a client to what to do next, which includes progressing to the base build process step 116. During the base build process step 116, basic governance structures are stood up, including processes, roles and team affiliations to run "Kinetic Pilots" as defined by the Transformation Lead. Because KTA's technique is to define all areas in the scope of the transformation program into discernable workstreams with generic names, work becomes bite-sized and prioritized into simple groups that can test an idea, measure its outcome, and then make any adjustments to improve as part of retesting or rerunning the cycle until a satisfactory outcome is achieved.

The use of objectivity or transparent action results in clearly defined outcomes and results in teams that are aligned and deliver results that are then used to generate momentum and even bigger results. This approach also removes cultural stigma and helps organize work and outcomes faster. Because data captured during the assessment process step 112 has been organized through the guided system, it can now be used in unique and distinct ways. For example, actions common to a change program, like standing up a work team, an investment committee, an intake funnel, etc., can all be templatized and enriched with data (e.g., FIG. 15).

Further, many of these processes are universal and are quite relevant even during the normal course of business in select situations, such as when an organization uses Centers of Excellence, Shared Services Centers, Central Program Management functions or any other organization construct that delivers ideas at scale. This means that habits articulated during the change can be easily customized to work in business as usual by repeating the Kinetic Work Cycle until it achieves the desired result. Where current program solutions are thought of as a means to an end, Kinetic Transformation views every program as an opportunity, should the client wish to use it, to help an organization do better.

To illustrate, consider two examples: (1) a program governance structure and (2) a governance structure for a lasting, central organization construct known as a Center of Excellence (CoE). While the outcomes of both programs will be quite different (e.g., a finite program as compared to an ongoing cost center to centralize tasks and bring scale), using Kinetic Transformation, the approach to bring them to life are fundamentally the same. In both scenarios, the same four processes occur—(1) assessing or understanding the program or function and the environment in which it lives (e.g., the assessment process step 112), (2) base building or prototyping processes and governance structures to run the program/function (e.g., the base build process step 116), (3) executing the delivery or testing of the base build (e.g., the execute process step 216), and (4) scaling or automating the base build and the program management via a leading tool or other custom solution (e.g., the scale process step 218).

While the first use case may end, the structure created may live on as a center of excellence in its own right with little to no adjustment to the Strategy "TO" Execution processes used during the life of the program. Similarly, in the second use case, through Kinetic Transformation, the lead will already put the new structure into action during the Execute process step 216 and improve it during the scale process step 218. Again, the same Strategy "TO" Execution processes are then cemented in business as usual because the team has already built the actions into habit during the program. This approach has typically resulted in substantially higher adoption rates and successful long term organization structures as compared to other methods.

Figure 16:
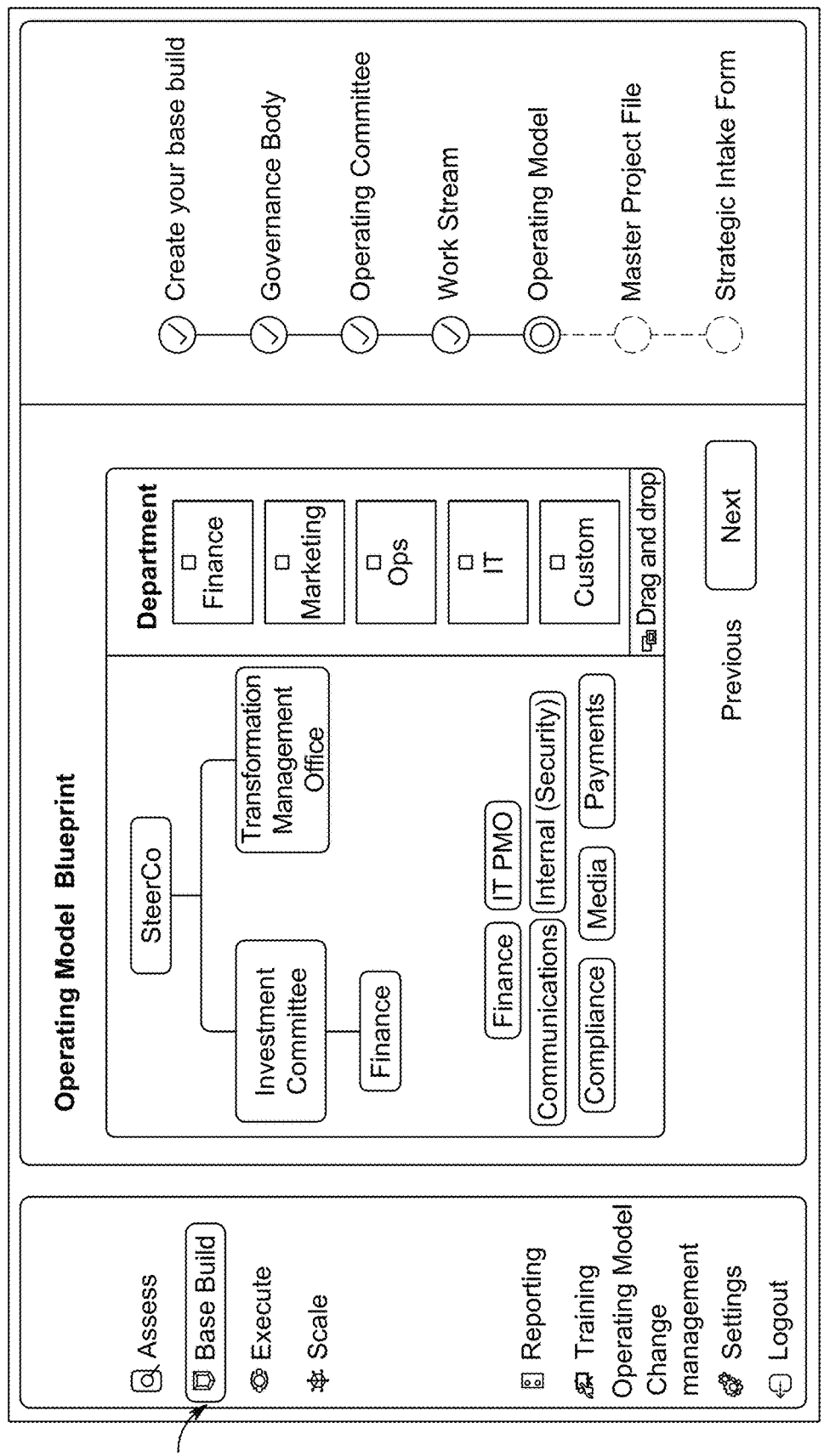
FIG. 16 depicts a schematic diagram showing an operating model blueprint screen of a KTA, in accordance with embodiments of the present invention.

Given the ambitions of the Kinetic Work Cycle, governance structures must also be flexible so that they can be quickly adjusted as new data is created and gathered by the leader during the normal course of the program's progression. As the structures are adjusted, the data from accumulated learnings is incorporated so that previous errors can be avoided. The KTA offers a solution, as illustrated in FIG. 16. The boxes in FIG. 16 represent Kinetic Work Teams or in the case of the CoE, organization functions, and the KTA engine 108 allows the client/customer 200 to drag the boxes around the diagram to run scenario analyses, such as change reporting relationships and the like. If there is a risk associated with the user-defined change, the data captured as part of the Kinetic Transformation Assessment can be used to identify potential obstacles so they may be remedied sooner or avoided all together.

The Execute Process Step 216

As Kinetic Pilots are put into action, projects created during the build process step 116 are moved into business as usual project management. The KTA engine 108 captures data about these projects in real-time and converts the data into useable reports that can be integrated into work processes, like ongoing meetings and executive report outs. All of these steps are similarly guided by the Kinetic Transformation custom workflow found in the KTA. Because the data is integrated across the Strategy "TO" Execution Value Chain, the flow into common project management reporting becomes possible. Further, the data may be managed and enriched in the system to provide unique insights based on Kinetic Transformation and the KTMs.

The data captured during this Execute process step 216 also provides more referenced data for further action, learning, and analysis delivered through customizable presentations. These presentations, both structured through the standard workflow or that arise through the normal course of the program, are captured in the KPH. Customizable presentations include things like a presentation to an executive audience or training at scale.

The Scale Process Step 218

During the scale process step 218, data is analyzed by the KTA engine 108 against processes and intended outcomes and is converted into recommendations for next steps. This analysis is facilitated by the ongoing capture of data, the KTMs, and the processing of the KTMs in the system. It should be appreciated that the specific KTM measures entered as part of the assessment are reviewed and updated periodically by the practitioner and are sent to a system generated report that is used to adjust actions and interventions, e.g. the closer a cycle comes to a KTM of 10 the better and more likely a user is ready for business as usual. Actions and interventions become physical manifestations of work as the recommended actions are approved in the system as part of ongoing Kinetic Transformation management process which also tracks status to resolution of the issue. Together with imported data from third-party systems, workflow automation and the like, the KTA can deliver unique insights and reporting through dashboards in a SaaS type model.

FIG. 17 depicts a schematic diagram associated with a sample deliverable for the KTMs. As described, the KTMs provide a unique, complete view of a transformation program for the client/customer 200. Specifically, FIG. 17 includes a first column 236 associated with a work stream name, a second column 238 associated with the $KTA_a$ value from Equation 1, a third column 240 associated with the $KTA_e$ value from Equation 1, and a fourth column 242 associated with the $KTA_p$ value from Equation 1. It should be appreciated that "work stream name" is a generic KTA term for any bite sized body of work with a discrete owner and desired outcomes.

Further, it should be appreciated that in this example, the "a" of the $KTA_a$ value is associated with an automation score of 0.97, the "e" of the $KTA_e$ value is associated with an environment score of 0.97, the "p" of the $KTA_p$ value is associated with a people score of 0.97. Each of the $KTA_e$ score, the $KTA_a$ score, and the $KTA_p$ score is between 0.03-0.97. Further, each of the ΔE score, the ΔP score, and the AA score are between 0.94-0. The S score is between 0.17-1. The KTA engine 108 may also provide implications of such KTM scores, such as "overall scores are higher because of 'shadow IT,'" "cultural tipping point is being realized (e.g., higher P score)," "lower A score would improve at the end of Pilot 2," and "E score is expected to improve with engagement of CPO."

It should be appreciated that sometimes the outcome of this analysis may be to exit a transformation mode and return to business as usual. Other times, more change may be required and another cycle may be recommended. To help determine the course of action, the Transformation Leader reviews earlier thoughts and hypotheses and updates findings as part of a previously defined update strategy. Over time, trends will be developed and artificial intelligence (AI) may be used to enhance the recommendations.

The Dashboard 202, Reporting, and Deliverables

As described, KTA is an integrated system for managing change using repeatable cycles that employ technology to gather data, facilitate collaboration, and streamline how data is generated and converted into action. Because Kinetic Transformation stresses alignment over tools or details, how the system reports data is critical. As a central feature of the Kinetic Transformation Accelerator system, data is fully integrated throughout the process of leading a program. This includes what data is generated and how it is displayed and actually used by practitioners.

The process of generating a custom dashboard (e.g., the dashboard 202) is built into the Kinetic Work Cycle and Strategy "TO" Execution Value Chain. The dashboard 202 is customizable by the client/customer 200 using common data fields. The system also allows for customization of field names, as well as the addition or removal of fields common to change programs and a specific organization. This process of using the system to drive the change and collaboratively turn the learning into visible actions are important components of the KTA. To create the custom dashboard 202, visual mock ups in excel and PowerPoint formats may be used. Since the data is normalized and actions are standardized through the KTA, the system includes design templates that make stand up of a dashboard easy. Models may be used to begin and then the system improves the models via the process steps of Act, Learn, Repeat. Because all of these processes are largely the same, the system can cement the process quickly and integrate it. In this way, the team spends less time on process and administration and more time getting tasks done against the goals.

Since data is structured in a standardized, indexed manner, it can be gathered with precision and manipulated into reports for broader use. Reports can offer generic learnings and be customized to a specific customer. Using the integrated Strategy "TO" Execution process, insights gleaned from custom data can then be quickly moved through the system.

FIG. 18 depicts a block diagram of a sample output from the algorithm and describes how data links KPM and a framework result in an output. In accordance with FIG. 18, the data architecture is a key feature of the system and includes a unique, unifying identification (ID) across client->portfolio->program->project->and tasks, owners and statuses. This last step is the start of project management, which will ultimately form the basis for plugging part of the KPF into workflow solutions like Smartsheet, Workfront, etc. The Kinetic Transformation Initiative includes the data architecture, the professional, and the infrastructure (e.g., the guided workflows, the templates, the cloud database, etc.). The system allows for the replacement of long duration traditional program structures with 3-4 month Kinetic Work Cycles supported by a technology called KTA to deliver the cycles at pace. The level of professional input required will vary by level of expertise (e.g. KTA Level 1 may be associated with the following terminologies "Scholar", "Apprentice", or "Practitioner" and KTA Level 4 may be associated with the terminology "Kinsultant"). The approach and system drive the user to the path that ultimately results in the KPH, KPF and KPD. Hence, the KPH, program/organization artifacts like PowerPoint slides for executive presentations, are autogenerated as the "KPH" by connecting the data via the algorithm expressed in FIG. 18.

Figure 21:
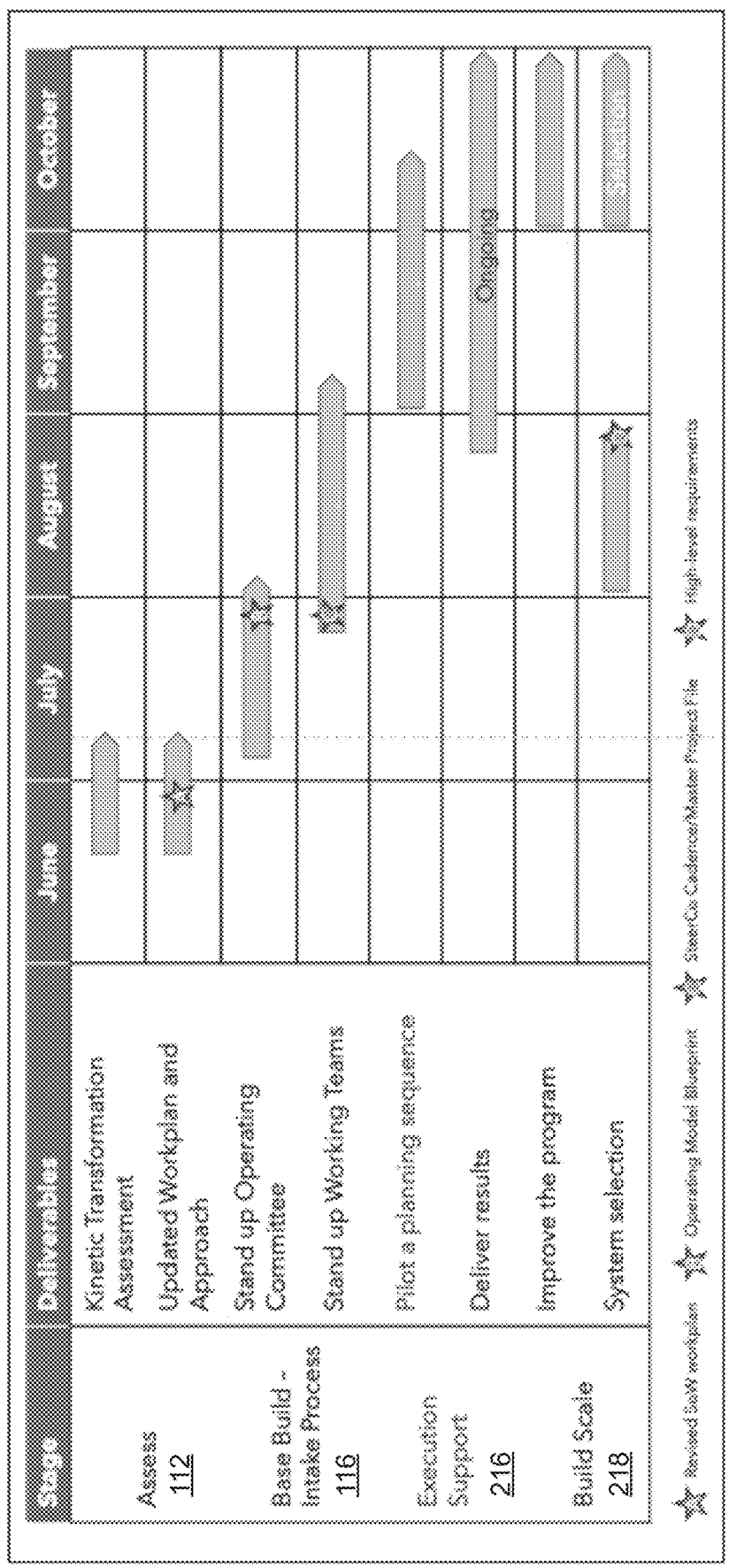
FIG. 21 depicts a schematic diagram associated with a sample deliverable for a program that includes the process steps of Assessing, Base Building, Executing, and Scaling, in accordance with embodiments of the present invention.

FIG. 19 depicts a block diagram of a sample analytic framework of the KTA output, FIG. 20 depicts a schematic diagram associated with a sample deliverable for goals and objectives assessment, and FIG. 21 depicts a schematic diagram associated with a sample deliverable for an integrated program plan. Specifically, this sample deliverable of FIG. 21 provides numerous results at the various stages (e.g., the assessment process step 112, the base build process step 116, the execute process step 216, and the scale process step 218). Additionally, FIG. 22 depicts a schematic diagram associated with a sample work plan for the customer/client 200.

For client-facing outcome production, the KTA engine 108 yields the KPH 210, the KPF 208, and the dashboard 202, which can be customized using forms into an ongoing licensed SaaS solution supported by a model (e.g., Just in Time Staffing model) that adds scale at the Kinetic Work Cycle demands. Because data is fully integrated, the client 202 can take full advantage of the KTA to quickly stand up programs, generate data and reports (e.g. KPH) with the latest data. Hence, the more the client/customer 200 uses the system, the better the data and the smarter it gets; another key feature of the Kinetic Transformation philosophy, or "Kinetic Improvement." To scale the KTA, a certification program may be used to train experts on the Kinetic Transformation and how to use the KTA to generate the Kinetic Work Cycles.

For the market-facing end product artifacts of this solution, data from across project programs are genericized in a single data lake (e.g., the KTA data lake 222) that generates custom and general market data and analytics concerning change and transformation programs. In some instances, this product may be sold separately from the Kinetic Transformation Accelerator technology-enabled solution described herein.

Computer System

Figure 23:
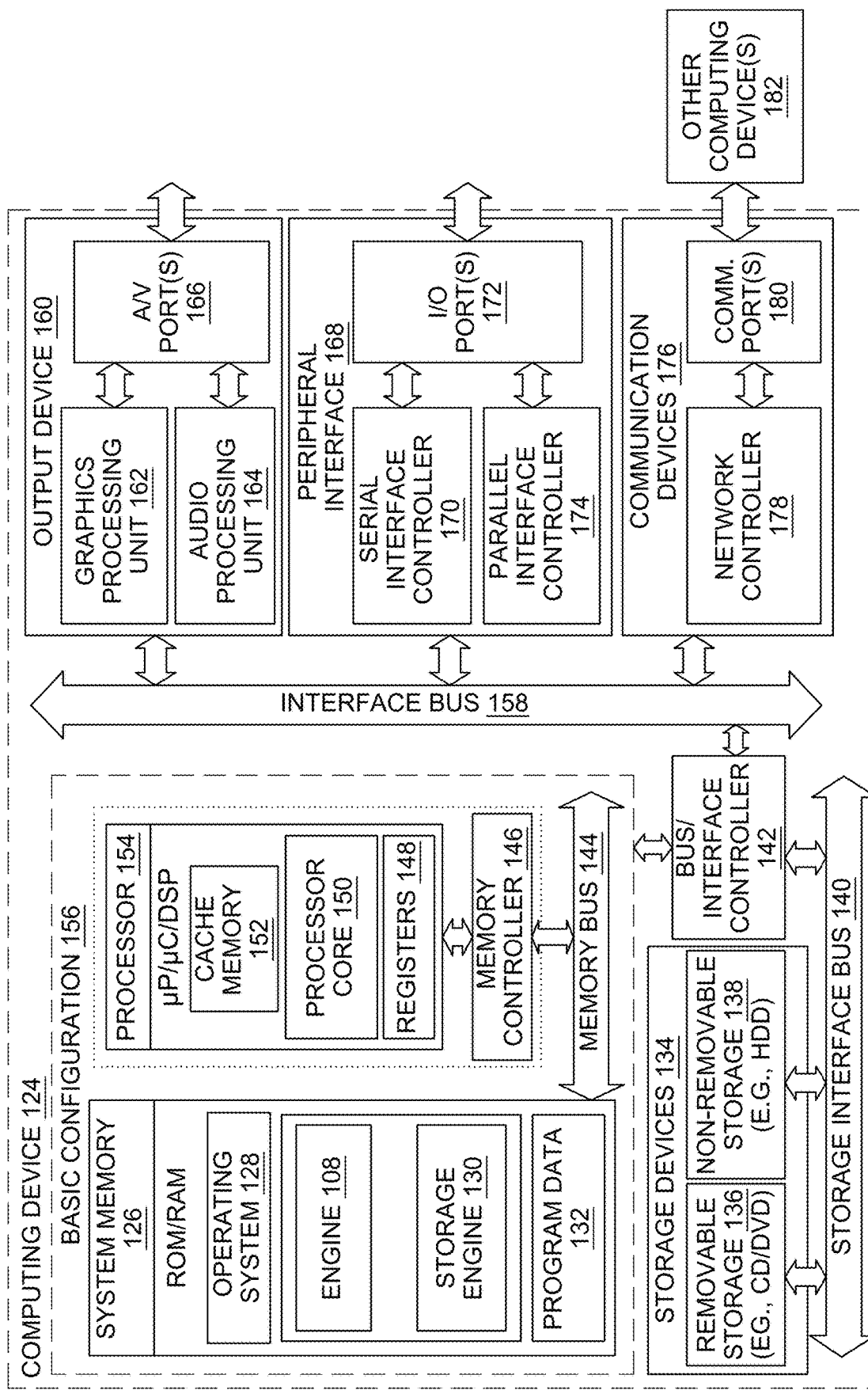
FIG. 23 is a block diagram of a computing device included within a computer system, in accordance with embodiments of the present invention.

In some embodiments, the present invention may be a computer system, a method, and/or the computing device 104 or the computing device 124 (of FIG. 23). For example, the computer system and/or the computing device 124 may be utilized to implement the method descried herein.

A basic configuration 156 of a computing device 124 is illustrated in FIG. 23 by those components within the inner dashed line. In the basic configuration 156 of the computing device 124, the computing device 124 includes a processor 154 and a system memory 126. In some examples, the computing device 124 may include one or more processors and the system memory 126. A memory bus 144 is used for communicating between the one or more processors 154 and the system memory 126.

Depending on the desired configuration, the processor 154 may be of any type, including, but not limited to, a microprocessor (P), a microcontroller (C), and a digital signal processor (DSP), or any combination thereof. Further, the processor 154 may include one more levels of caching, such as a level cache memory 152, a processor core 150, and registers 148, among other examples. The processor core 150 may include an arithmetic logic unit (ALU), a floating point unit (FPU), and/or a digital signal processing core (DSP Core), or any combination thereof. A memory controller 146 may be used with the processor 154, or, in some implementations, the memory controller 146 may be an internal part of the memory controller 146.

Depending on the desired configuration, the system memory 126 may be of any type, including, but not limited to, volatile memory (such as RAM), and/or non-volatile memory (such as ROM, flash memory, etc.), or any combination thereof. The system memory 126 includes an operating system 128, one or more engines, such as the engine 108 (e.g., the KTA engine 108), and program data 132. In some embodiments, the engine 108 may be an application, a software program, a service, or a software platform, as described infra. The system memory 126 may also include a storage engine 130 that may store any information or data disclosed herein.

Moreover, the computing device 124 may have additional features or functionality, and additional interfaces to facilitate communications between the basic configuration 156 and any desired devices and interfaces. For example, a bus/interface controller 142 is used to facilitate communications between the basic configuration 156 and data storage devices 134 via a storage interface bus 140.

The data storage devices 134 may be one or more removable storage devices 136, one or more non-removable storage devices 138, or a combination thereof. Examples of the one or more removable storage devices 136 and the one or more non-removable storage devices 138 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 158 facilitates communication from various interface devices (e.g., one or more output devices 160, one or more peripheral interfaces 168, and one or more communication devices 176) to the basic configuration 156 via the bus/interface controller 158. Some of the one or more output devices 160 include a graphics processing unit 162 and an audio processing unit 164, which are configured to communicate to various external devices, such as a display or speakers, via one or more A/V ports 166.

The one or more peripheral interfaces 168 may include a serial interface controller 170 or a parallel interface controller 174, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 172.

Further, the one or more communication devices 176 may include a network controller 178, which is arranged to facilitate communication with one or more other computing devices 182 over a network communication link via one or more communication ports 180. The one or more other computing devices 182 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 126, the one or more removable storage devices 136, and the one or more non-removable storage devices 138 are examples of the computer-readable storage media. The computer-readable storage media is a tangible device that can retain and store instructions (e.g., program code) for use by an instruction execution device (e.g., the computing device 124). Any such, computer storage media is part of the computing device 124.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 154 of a general purpose computer, special purpose computer, or other programmable data processing apparatus (e.g., the computing device 124) to produce a machine, such that the instructions, which execute via the processor 154 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 124), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in one or more of the method steps. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method executed by an engine on a computing device for providing a psychological based approach for organizational growth of a business, the method comprising:

providing a kinetic transformation accelerator having a system-generated analytical framework, wherein, the kinetic transformation accelerator comprising an artificial intelligence component and a kinetic transformation algorithm, the kinetic transformation accelerator includes a guided workflow configured for a user to complete stages of a kinetic work cycle, wherein, the stages of the kinetic work cycle comprises a project assessment process; a base build process, an execute process, and a scale process;

providing, via a graphical user interface (GUI) of the computing device, a dashboard to the user;

wherein the project assessment process comprises:
providing, via the GUI and to the user, the system-generated analytical framework through a questionnaire associated with the project of a business, wherein the questionnaire comprises standard industry practice questions;
receiving, via the GUI and from the user, a response to each question of the questionnaire;
capturing data, by the kinetic transformation accelerator, from the response to each question of the questionnaire;
scrubbing the data, using an exact, transform, load process comprising:
extracting the data;
transforming the data; and
loading the data into an output data container of the kinetic transformation accelerator;
wherein the output data container being a data lake having a central dataset of the project, wherein the data from the project is genericized and anonymized in the data lake;
responsive to genericizing, generating marketing data and analytics;
analyzing the data, by the kinetic transformation accelerator, to predict and drive a resolution of one or more problems associated with the project, wherein the resolution comprises a workplan for the business;
presenting the workplan via the GUI to the user;

wherein, the base build process includes a cloud database of the kinetic transformation accelerator storing a kinetic program handbook and comprises:

creating one or more governance structures, by the kinetic transformation accelerator, in the business to execute the workplan, wherein the governance structure includes a process, a role, and a team affiliation to run a kinetic pilot;

wherein, the execute process includes piloting a planning sequence comprising:
executing, by the kinetic transformation accelerator, one or more process steps to test the workplan; and wherein, the scale process includes improving the project and selecting a third-party system to expand a scope of the project and create a plan comprising:
executing, by the kinetic transformation accelerator, one or more process steps to scale or automate the workplan.

2. The method of claim 1, wherein the project is a change project for the business.

3. The method of claim 1, further comprising:
prompting the user, via the GUI, to input a list of stakeholders for the project;
receiving, from the user and via the GUI, the list of stakeholders for the project; and
transmitting a message to each stakeholder of the list of stakeholders via a communication means.

4. The method of claim 1, wherein the data is stored in a database.

5. The method of claim 1, wherein the workplan provides measurable outcomes and actions for the business to engage in to address the one or more problems associated with the project.

6. The method of claim 1, wherein each question of the questionnaire is associated with employees of the business, a culture of the business, goals associated with the project, or budgets associated with the project.

7. The method of claim 1, wherein each problem of the one or more problems comprises a location factor associated with where the one or more problems are predicted to arise and a timing factor associated with when the one or more problems are predicted to occur.

8. The method of claim 1, wherein the workplan is user-customizable.

9. The method of claim 1, further comprising: providing at least one of advisory services and expert consulting services to the user or to the business to assist in an execution of the workplan.

10. The method of claim 1, wherein an automation of the workplan occurs via an application programming interface (API).

11. The method of claim 1, wherein an automation of the workplan occurs via a third-party product/tool.

12. The method of claim 1, wherein the data is captured in real-time.

* * * * *